(12) United States Patent
Harada et al.

(10) Patent No.: US 6,392,725 B1
(45) Date of Patent: May 21, 2002

(54) SYSTEMS AND METHODS FOR PROVIDING A STORAGE MEDIUM

(75) Inventors: Haruo Harada; Naoki Hiji; Hiroshi Arisawa; Hideo Kobayashi; Takeo Kakinuma; Daisuke Tsuda, all of Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/192,402

(22) Filed: Nov. 16, 1998

(30) Foreign Application Priority Data

Nov. 18, 1997  (JP) .............................. 9-317049

(51) Int. Cl.[7] ..................... G02F 1/1347; G02F 1/1333; C09K 19/02
(52) U.S. Cl. .............................. 349/74; 349/78; 349/81; 349/94; 349/176
(58) Field of Search .............................. 349/74, 76, 78, 349/81, 176, 35; 345/94

(56) References Cited

U.S. PATENT DOCUMENTS

| | | | |
|---|---|---|---|
| 5,058,999 A | * 10/1991 | Davis | 349/74 |
| 5,200,845 A |   4/1993 | Crooker et al. | |
| 5,469,280 A | * 11/1995 | Jang | 349/74 |
| 5,801,796 A | *  9/1998 | Lowe | 349/74 |
| 5,872,609 A | *  2/1999 | Hiji et al. | 349/123 |
| 5,877,826 A | *  3/1999 | Yang et al. | 349/36 |
| 6,094,244 A | *  7/2000 | Kawata et al. | 349/74 |
| 6,130,732 A | * 10/2000 | Crawford et al. | 349/176 |
| 6,133,971 A | * 10/2000 | Silverstein et al. | 349/176 |

FOREIGN PATENT DOCUMENTS

| | | |
|---|---|---|
| EP | 0 856 765 A1 | 8/1998 |
| JP | 62-266521 | 11/1987 |
| JP | 2-170122 | 6/1990 |
| JP | 3-52843 | 8/1991 |
| JP | 3-198028 | 8/1991 |
| JP | 3-209425 | 9/1991 |
| JP | 5-313145 | 11/1993 |
| JP | 6-258622 | 9/1994 |
| JP | 6-265854 | 9/1994 |
| JP | 7-287214 | 10/1995 |
| JP | 9-160066 | 6/1997 |
| JP | A-10-198293 | 7/1998 |
| JP | 10-206882 | * 8/1998 |
| JP | 10-222047 | 8/1998 |

OTHER PUBLICATIONS

Ekisho Device Handbook (Liquid Crystal Device Handbook), Nikkan Kogyo ShinbunSha, pp. 456–457.

J. William Doane et al., "Reflective Cholesteric Liquid–Crystal Displays", Information Display, Dec., 1996, pp. 18–21.

* cited by examiner

Primary Examiner—William L. Sikes
Assistant Examiner—Tarifur R. Chondhury
(74) Attorney, Agent, or Firm—Oliff & Berridge, PLC

(57) ABSTRACT

This invention provides a storage medium, method of writing images to a storage medium, method of forming a storage medium and a storage medium formed using the method of forming a storage medium. The storage medium provides a display which has memory capability without power, allows images to be updated quickly by external equipment, and is capable of a full-color display. The storage medium includes three display layers having cholesteric liquid crystals which selectively reflect blue, green, and red, respectively, and are different from each other in texture change threshold voltage. The display layers are stacked between substrates and a light absorption layer is provided. An image writing apparatus is formed separately from the storage medium and provides write electrodes sandwiching the storage medium. A write signal is applied between the electrodes with a voltage, wherein the voltage is selected from seven levels of voltage which are produced based on the respective texture change threshold voltages of the cholesteric liquid crystal display layers.

35 Claims, 18 Drawing Sheets

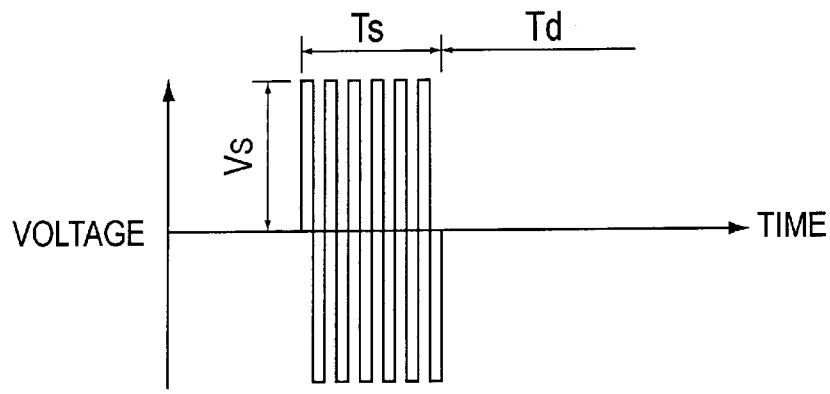
FIG. 7(A)
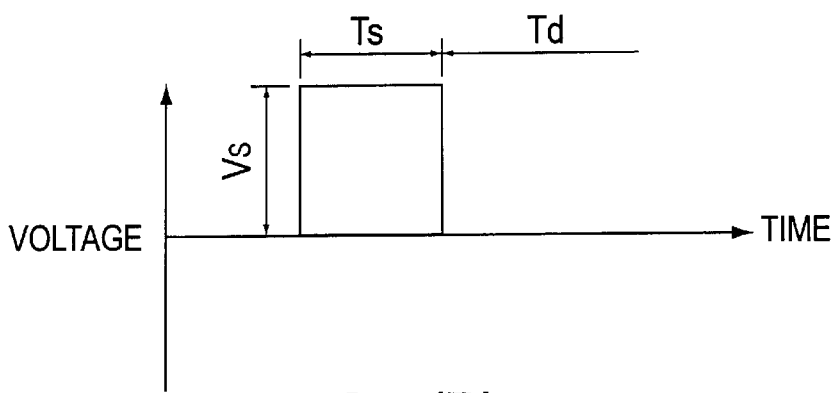
FIG. 7(B)
| SELECT VOLTAGE Vs | |
|---|---|
| Va | Vb |
| f/f/f | p/p/p |
8A / 8B / 8C
FIG. 8

|  | REFRESH VOLTAGE Vr | | | | | |
|---|---|---|---|---|---|---|
| SELECT VOLTAGE Vs | | Vb | Vc | Vd | Ve | Vf | Vg |
| | Va | f/?/? | f/f/? | f/f/f | p/f/f | p/p/f | p/p/p |
| | Vb | – | f/f/? | f/f/f | f/f/f | f/p/f | f/p/p |
| | Vc | – | – | f/f/f | f/f/f | f/f/f | f/f/p |
| | Vd | – | – | – | f/f/f | f/f/f | f/f/f |
| | Ve | – | – | – | – | p/f/f | p/f/f |
| | Vf | – | – | – | – | – | p/p/f |

FIRST EMBODIMENT

FIG. 14

| SELECT VOLTAGE Vs | DISPLAY COLOR |
|---|---|
| 3.6 kV | WHITE |
| 1.0 kV | BLACK |

SECOND EMBODIMENT

FIG. 15

| SELECT VOLTAGE Vs | DISPLAY COLOR |
|---|---|
| 4.0 kV | WHITE |
| 1.2 kV | BLACK |

FIFTH EMBODIMENT

FIG. 16

| REFRESH VOLTAGE Vr | SELECT VOLTAGE Vs | DISPLAY COLOR |
|---|---|---|
| 5.0 kV | 0 V | WHITE |
| 1.8 kV | 0 V | BLACK |
| 2.6 kV | 0 V | RED |
| 3.3 kV | 520 V | GREEN |
| 5.0 kV | 610 V | BLUE |
| 5.0 kV | 490 V | CYAN |
| 3.3 kV | 0 V | YELLOW |

PLANAR TEXTURE

FOCAL CONIC TEXTURE

HOMEOTROPIC TEXTURE

SYSTEMS AND METHODS FOR PROVIDING A STORAGE MEDIUM

BACKGROUND OF THE INVENTION

1. Field of Invention

This invention relates to a storage medium which displays images (including information such as characters, graphics and data) and stores a display status thereof. This invention also relates to a method and apparatus for writing images to the storage medium, a method of forming the storage medium and a storage medium formed using the method.

2. Description of Related Art

Bulk consumption of paper around offices results in destruction of forest resources and environmental pollution resulting from refuse disposal and incineration. However, with widespread use of personal computers and the advent of our advanced information-intensive society brought about by the Internet and the like, the trend is moving toward more and more consumption of paper as so-called short-life documents intended for temporary browsing of electronic information, so that the advent of display storage media to replace paper is desired.

Paper has the following advantageous information display characteristics not found in conventional displays: 1) paper is capable of a bright and high-contrast reflective full-color display, is easy to read, and displays large quantities of information; 2) paper is structurally lightweight, thin, and flexible and therefore, is viewable in a comfortable position and under desirable brightness; 3) paper has memory capability, can display and store information without power, and provides a flicker-free and easy-on-the-eyes display; and 4) paper is inexpensive and facilitates an easy understanding of simultaneous displays of a plurality of sheets of paper, thereby allowing information comparison and browsing. These characteristics of paper, in turn, drive users to print information displayed on a display unit on paper before reading it.

Therefore, there is a need for display storage media to replace paper that have the above-mentioned paper-specific characteristics with the addition of a rewritable capability which would contribute to resource saving and reduction in refuse.

A display method, generally called NCAP, disclosed in Japanese Patent Publication No. Hei 3-52843, which uses droplets of nematic liquid crystal having positive dielectric anisotropy dispersed in a polymer matrix as shown in FIG. 23, has been proposed. With this method, the following two states are produced and a black and white monochrome display is obtained by switching between the states and providing a light absorption layer on a non-display surface: (1) an initial state as shown in FIG. 23(A) in which liquid crystal directors orient in random directions under the influence of the surface of the polymer matrix and incident light is scattered due to mismatch of refractive indexes between the polymer matrix and the liquid crystals; and (2) a state as shown in FIG. 23(B) in which the liquid crystal directors orient in a field direction by applying a voltage and incident light transmits due to match of refractive indexes between the polymer matrix and the liquid crystals.

However, this method has a drawback in that, when a white display is performed by back scattering resulting from mismatch of refractive indexes between the polymer matrix and the liquid crystals, a reflectance of only 10 to 15% is obtained because the difference of refractive indexes between the polymer and the liquid crystal is not so large and a sufficient scattering is not obtained. Thus, a bright and high-contrast display cannot be obtained.

To overcome this drawback, dyes have been added to the liquid crystal to improve brightness and contrast. However, this method has a serious drawback in that there is no memory capability in transparent state of a black display and no information can be displayed and saved without power.

On the other hand, as a method of performing a display with memory capability, for example, there is known a method by which texture change is caused by heat and a field using a smectic liquid crystal as shown on Page 456 of the Liquid Crystal Device Handbook (published by Nikkan Kogyo Shimbun).

According to this method, the following two states are produced and a black and white monochrome display is obtained by switching between the states and providing a light absorption layer on a non-display surface: (1) a state in which incident light is scattered by a focal conic texture obtained by cooling electric-field-free a smectic liquid crystal heated to an isotropic state as shown in the upper portion of FIG. 24 as shown in FIG. 24(A); and (2) a state in which incident light is transmitted by a homeotropic texture obtained by cooling a smectic liquid crystal heated to an isotropic state as shown in the upper portion of FIG. 24 while applying a field as shown in FIG. 24(B).

However, this method has a drawback in that, although information can be displayed and saved without power, a white display is performed by the disorder of the layer structure of a smectic liquid crystal from which sufficient back scattering is not obtained, and the reflectance of the white display is low like the above-mentioned NCAP. Thus, a bright and high-contrast display cannot be obtained.

According to a method by which a display is performed while switching between transparent state and scattering state, such as conventional examples shown in FIG. 23 or 24, a color display can be performed using an "array system" which arranges pixels producing different colors on a display surface, such as a method of combination with color filters, for example.

However, the array system has a drawback in that, since it requires exact alignment of pixel portions each producing a different color, and addressing portions writing data corresponding to each color, it is difficult to write an image to a display element from the outside. It is necessary to provide electrodes subjected to patterning and the like within the display element. Thus, the display element becomes costly.

On the other hand, there are proposed several color display methods using a "stack system" which arranges elements producing different colors in an observation direction. For example, according to a method disclosed in Japanese Published Unexamined Patent Application No. Hei 3-209425, as shown in FIG. 25, three display layers 38A, 38B, and 38C selectively reflecting blue, green, and red, respectively, are stacked between a pair of substrates 32 and 33 such that droplets of cholesteric liquid crystal 42 having negative dielectric anisotropy are dispersed in a polymer matrix 41 within each display layer. A separation substrate 34 intervenes between the display layers 38A and 38B and a separation substrate 35 intervenes between the display layers 38B and 38C. A light absorption layer 36 is provided on a non-display surface and drive electrodes 37 subjected to patterning of each of the display layers 38A, 38B, and 38C are connected to a drive circuit 50 comprising a drive power supply and a switch 52.

According to this method, the following two states are produced and a color display is obtained by switching between the states: an initial state in which liquid crystal directors orient in random directions under the influence of the surface of the polymer matrix 41 and incident light almost transmits; and a state in which the helical axes of cholesteric liquid crystals 42 are oriented in a field direction by applying a voltage and a specified color in incident light is selectively reflected.

Further, "Reflective Cholesteric Liquid-Crystal Displays," Information Display, pages 18–21, December 1996, describes the use of cholesteric liquid crystals having positive dielectric anisotropy in a color display element of the stack system, as shown in FIG. 25, is described.

However, since these methods require that the stacked display layers 38A, 38B, and 38C be switched separately, it is impossible to write an image to the display element from the outside. Accordingly, it becomes necessary to provide drive electrodes 37 subjected to patterning for each of the display layers 38A, 38B, and 38C within a display element, so that disadvantageously the display element becomes costly.

A display method by which droplets of cholesteric liquid crystal having negative dielectric anisotropy are dispersed in a polymer matrix and texture change is caused by heat and a field is shown in Japanese Published Unexamined Patent Application No. Hei 6-258622.

According to this method, as shown in FIG. 26, in a color display element of the stack system as shown in FIG. 25, plane drive electrodes 39 common to pixels, are provided in each of the display layers 38A, 38B, and 38C in place of drive electrodes subjected to patterning. The following two states are produced and a color display is obtained by switching between the states: (1) a state in which incident light is almost transmitted by a random state obtained by cooling electric-field-free cholesteric liquid crystals 42 in each of the display layers 38A, 38B, and 38C, the cholesteric liquid crystals 42 having been heated to an isotropic state by a combination of heat from a heat source, such as laser shown in FIG. 60, and application of a field by a drive circuit 50; and (2) a state in which a specified color in incident light is selectively reflected by a planar texture obtained by cooling the cholesteric liquid crystals 42 heated to an isotropic state while applying a field.

However, this method also has a drawback in that the drive electrodes 39, which are not ones subjected to patterning but plane ones common to pixels, must be provided for each of the display layers 38A, 38B, and 38C within a display element. Thus, the display element becomes costly like the method shown in FIG. 25. Further, it takes a long time to write an image because it is written while performing heating and cooling for each pixel by a heat source, such as laser.

In contrast to these methods, there are also proposed several methods which enable an image to be written to a display element from the outside by switching among a plurality of display layers using only one drive signal without providing drive electrodes for each of the display layers within a display element in a color display element of the stack system.

For example, in Japanese Published Unexamined Patent Application Nos. Hei 3-198028 and Hei 6-265854 is shown a method by which a plurality of display layers, each with dichroic dyes mutually different in absorption wavelength range being contained in a liquid crystal, are stacked, and a plurality of colors are displayed by only one drive signal using a difference of threshold voltage among liquid crystals in each display layer.

Further, in Japanese Published Unexamined Patent Application No. Hei 5-31315 is shown a method by which a plurality of liquid crystal microcapsules containing dichroic dyes different in absorption wavelength range are mixed and a plurality of colors are displayed by only one drive signal, using a difference of threshold voltage among liquid crystals of each capsule.

However, according to these methods, for example, a plurality of display layers or capsules, shown as layers A, B, and C in FIG. 27(A), whose display state changes unidirectionally, such as from dark off-state to bright on-state in response to applied voltage, are used. Since the threshold voltage of switching among the display layers or capsules is changed, even when the voltage Va, Vb, Vc, and Vd between the threshold values of the display layers or capsules are applied, control can be performed only so that the display layers or capsules change to the bright on-state in ascending order of threshold voltage. Thus, it is impossible to perform control so that only a particular display layer or capsule is driven into the bright on-state.

Accordingly, all three primary colors, blue, green, and red, or cyan, magenta, and yellow, cannot be displayed even if the principle of additive color mixture or subtractive color mixture is used. Thus, these methods have the drawback of being incapable of full color display.

As described above, in an attempt to produce paper-like display storage media by traditional technologies, a drawback with display storage media of monochrome display is that a bright, high-contrast display cannot be obtained because of the low reflectance in a white display. A drawback with display storage media of a color display is that it is impossible to write full-color images by external equipment because a plurality of display layers for displaying the three primary colors cannot be controlled simultaneously and independently by only one drive signal.

SUMMARY OF THE INVENTION

In view of the above, the present invention provides a storage medium which has memory capability without power. The storage medium is capable of a bright and high-contrast black-and-white reflective monochrome display or reflective full-color display, allows images to be written and updated quickly by external equipment, is structurally lightweight, thin, and flexible, and is inexpensive to manufacture. The present invention also provides a method and an apparatus which enables images, i.e. characters, graphics, data, and the like, to be written to the storage medium from outside the storage medium.

According to a first aspect of the storage medium, a plurality of display layers, which selectively reflect mutually different wavelengths of the electromagnetic spectrum, are stacked between a pair of substrates at least one of which is transparent. An image is written in such a manner that a voltage is applied to the plurality of stacked display layers from an external image writing apparatus.

The present invention, as a second aspect, provides a storage medium wherein the plurality of display layers have different texture change threshold voltages for voltage applied from an external image writing apparatus.

As a third aspect of the present invention the plurality of display layers comprise a display layer selectively reflecting visible light having a peak in a wavelength range of 400 to 500 nm, a display layer selectively reflecting visible light having a peak in a wavelength range of 500 to 600 nm and a display layer selectively reflecting visible light having a peak in a wavelength range of 600 to 700 nm.

As a fourth aspect of the invention, the plurality of display layers each have a PNLC structure in which a polymer network is formed in a continuous phase of cholesteric liquid crystals.

As a fifth aspect of the invention, the plurality of display layers each have a PDLC structure in which cholesteric liquid crystals are dispersed in a polymer matrix.

As a sixth aspect of the invention, the plurality of display layers each comprise two display layers which selectively reflect a mutually identical color of visible light and are opposite in helical twist direction to each other.

As a seventh aspect of the invention, the pair of substrates have flexibility.

As an eighth aspect of the invention, a common electrode is provided in one substrate.

The present invention also provides a method of writing images to a storage medium in which a write signal is applied to a plurality of stacked display layers from an external image writing apparatus using a voltage Vs, wherein Vs is an applied voltage in a select stage of the write signal and causes all the cholesteric liquid crystals of the plurality of display layers to change to the same alignment state. The write signal consists of at least the select stage and a subsequent voltage-free display stage.

The present invention also provides a method of writing images to a storage medium in which a write signal is applied to the plurality of stacked display layers from an external image writing apparatus with a voltage having a relation of Vr>Vs, wherein the voltage is selected from a plurality of levels of voltage which are produced based on the respective threshold voltages of cholesteric liquid crystals of the plurality of display layers. Vr and Vs are the applied voltages in a refresh stage and a select stage of the write signal, respectively, which includes the refresh stage, the select stage, and a subsequent voltage-free display stage.

The present invention also provides an apparatus for writing images to a storage medium through which a write signal is applied to a plurality of stacked display layers from the outside of the storage medium using a voltage Vs, wherein Vs is an applied voltage in the select stage of a write signal and causes all the cholesteric liquid crystals of the plurality of display layers to change to the same alignment state. The write signal consists of at least the select stage and a subsequent voltage-free display stage.

The present invention also provides an apparatus for writing images to a storage medium through which a write signal is applied to the plurality of stacked display layers from the outside of the storage medium with a voltage having a relation of Vr>Vs, wherein the voltage is selected from a plurality of levels of voltage which are produced based on the respective threshold voltages of cholesteric liquid crystals of the plurality of display layers. Vr and Vs are respectively the applied voltages in a refresh stage and a select stage of a write signal, which includes the refresh stage, the select stage, and a subsequent voltage-free display stage.

In the description of the present invention, the term "cholesteric liquid crystal" includes chiral nematic liquid crystal, or chiral smectic liquid crystal and the like.

Cholesteric liquid crystals having liquid crystal molecules of helical structure cause a selective reflection phenomenon. That is, they divide incident light into right circularly polarized light and left circularly polarized light, and Bragg-reflect circularly polarized light components matching a helical twisting direction and transmit residual light components. Letting a helical pitch length, an average refraction index within a plane orthogonal to a helical axis, and birefringence be p, n, and $\Delta n$, respectively, the central wavelength $\lambda$ of reflection light and reflection wavelength width $\Delta\lambda$ are represented by n·p and $\Delta n$·p, respectively, so that reflection light caused by cholesteric liquid crystal layers develop vivid colors dependent on the helical pitch length.

Cholesteric liquid crystals having positive dielectric anisotropy exhibit three states: (1) a planar texture as shown in FIG. 21(A), in which helical axes are perpendicular to the cell surface and the above-mentioned selective reflection phenomenon occurs for incident light; (2) a focal conic texture as shown in FIG. 21(B), in which helical axes are almost parallel with the cell surface and incident light is transmitted while being front scattered; and a (3) homeotropic texture as shown in FIG. 21(C), in which a helical structure collapses, liquid crystal directors orient in a field direction, and incident light is almost wholly transmitted.

Of the three states described above, the planar texture and the focal conic texture can exist bi-stably at zero field. Therefore, the state of cholesteric liquid crystal is not uniquely determined for a volatage applied to a liquid crystal layer. When the planar texture exists initially, texture transition occurs in the order of planar texture, focal conic texture, and homeotropic texture as voltage increases, and when the focal conic texture exists initially, texture transition occurs in the order of focal conic texture and homeotropic texture as applied voltage increases. On the other hand, when a voltage applied to a liquid crystal layer is abruptly set to zero, the planar texture and the focal conic texture stay unchanged and the homeotropic texture changes to the planar texture.

Accordingly, after a pulse signal is applied, a cholesteric liquid crystal layer exhibits a "well-type" electro-optical response as shown, for example, in FIG. 22. The term "well-type" electro-optical response refers to the general shape of the curve shown in FIG. 22 and is not meant to refer to the specific data points shown in FIG. 22.

As shown in FIG. 22, when the voltage of an applied pulse signal is Vfh 90 or more, selective reflection occurs as a result of texture transition from the homeotropic texture to the planar texture. When the voltage of an applied pulse signal is between Vpf 10 and Vfh 10, transparent by the focal conic texture occurs. When the voltage of an applied pulse signal is Vpf 90 or less, the state before the pulse signal was applied occurs. That is, selective reflection by the planar texture or transparent by the focal conic texture occurs.

In FIG. 22, the vertical axis, which represents normalized reflectance, normalizes reflectance with the maximum reflectance as 100 and the minimum reflectance as 0. Since transition regions exist among the states of the planar texture, focal conic texture, and homeotropic texture, the portion of normalized reflectance of 90 or more is defined as selective reflection state and the portion of normalized reflectance of 10 or less is defined as transparent state. The threshold voltages of texture change from the planar texture to the focal conic texture are defined as Vpf 90 and Vpf 10 before and after the transition region, respectively, and the threshold voltage of texture change from the focal conic texture to the homeotropic texture are defined as Vfh 10 and Vfh 90 before and after the transition region, respectively.

Particularly, in display layers of PNLC or PDLC structure to which a polymer is added to cholesteric liquid crystals, because of interference (anchoring effect) in the interface between a cholesteric liquid crystal and a polymer, bi-stability of the planar texture and the focal conic texture at zero field is improved and a state after a pulse signal is applied can be kept for a long time.

In a storage medium according to this invention, using the bi-stable phenomenon of the cholesteric liquid crystal, a black-white monochrome display having electric-field-free memory capability or a color display having electric-field-free memory capability is performed by switching between selective reflection by the planar texture and transparent by the focal conic texture.

A storage medium according to this invention does not require internal electrodes and wiring for applying a voltage or one that has only electrodes common to pixels in one substrate. In the case of the former, an image is written to the storage medium by applying a voltage between a pair of substrates of the storage medium from an external image writing apparatus by write electrodes which are positioned so as to sandwich the pair of substrates of the storage medium. In the case of the latter, an image is written to the storage medium by applying a voltage between the common electrode of the storage medium and another substrate from an external image writing apparatus by the common electrode on one substrate of the storage medium and an electrode included in the external image writing apparatus, the electrode being positioned outside another substrate of the storage medium.

In either case, to each display layer is applied a voltage determined by a relationship of resistance values and capacitance among components of a pair of substrates or another substrate, each display layer, and a separation layer provided as required. Since any components normally exhibit sufficiently large resistance values, the ratio of voltages to the components almost depends on the ratio of capacitance. Also, since cholesteric liquid crystals have dielectric anisotropy and electrostatic capacity changes depending on the respective states of planar texture, focal conical phase, and homeotropic texture, a voltage applied to each display layer also changes depending on the switching of any display layer.

Therefore, in a storage medium according to this invention, as shown in FIG. 22, by combining the electro-optical response for a voltage actually applied to each display layer with a voltage ratio depending on the ratio of capacitance of components of the storage medium the alignment state of each display layer for a voltage applied by an external image writing apparatus is obtained and is controlled to change to a desired state whereby each display layer can be switched simultaneously and independently.

When an image writing method is used for a storage medium, a write signal is applied to the plurality of stacked cholesteric liquid crystal display layers from an external image writing apparatus with a voltage Vs, wherein Vs is an applied voltage in a select stage Ts of a write signal and causes all the plurality of cholesteric liquid crystal display layers to change to the same alignment state. The write signal consists of at least the select stage Ts and a subsequent electric-field-free display stage Td, whereby (1) all the plurality of cholesteric liquid crystal display layers are changed to the planar texture state, or (2) all the plurality of cholesteric liquid crystal display layers are changed to the focal conic texture state.

Accordingly, the following three cholesteric liquid crystal display layers, for example, are stacked: a layer selectively reflecting blue light having a peak in a wavelength range of approximately 400 to 500 nm; a layer selectively reflecting green light having a peak in a wavelength range of approximately 500 to 600 nm; and a layer selectively reflecting red light having a peak in a wavelength range of approximately 600 to 700 nm. A light absorption layer is provided opposite to an external light incident side, whereby (1) three cholesteric liquid crystal display layers all become the selective reflection state and white is displayed by additive color mixture, or (2) the three cholesteric liquid crystal display layers all become the transparent state and light transmitting through the three cholesteric liquid crystal display layers is all absorbed in the light absorption layer and black is displayed, so that two colors, black and white, can be displayed within one pixel.

Since a maximum reflectance of 50% is obtained in a peak wavelength range in the selective reflection phenomenon by cholesteric liquid crystals, a high integral reflectance can also be obtained in a white display represented by additive color mixture, so that a bright and high-contrast display can be performed.

Furthermore, a brighter display can be obtained by forming a plurality of display layers such that each of them is constituted of two display layers which selectively reflect a mutually identical color and are opposite to each other in the helical twisting direction of cholesteric liquid crystals.

A storage medium according to this invention has no internal electrodes and wires for applying a field or has a common electrode only in one substrate and requires no internal drive circuit. Thus, the storage medium it can be manufactured inexpensively and can be structurally lightweight, thin, and flexible.

In the case of using an image writing method for a storage medium when three cholesteric liquid crystal layers, are stacked, a write signal is applied to the three stacked cholesteric liquid crystal display layers from an external image writing apparatus with a voltage having a relation of Vr>Vs. Vr and Vs are respectively the voltages in the refresh stage Tr and the select stage Ts of a write signal, which includes a refresh stage Tr, a select stage Ts, and a subsequent electric-field-free display stage Td. The voltage is selected from seven levels of voltage which are produced based on the respective texture change threshold voltages of the three cholesteric liquid crystal display layers. One of the following four texture change states is obtained: (1) all the three cholesteric liquid crystal display layers are in the state of planar texture; (2) all the three cholesteric liquid crystal display layers are in the state of focal conic; (3) one of the three cholesteric liquid crystal display layers is in the state of planar texture and the two remaining layers are in the state of focal conic texture; and (4) two of the three cholesteric liquid crystal display layers are in the state of planar texture wherein the two layers include a layer whose threshold voltage is in the middle of them of other two layers, and the remaining layer is in the state of focal conic texture.

Accordingly, the following three cholesteric liquid crystal display layers, for example, are stacked: a layer selectively reflecting blue light having a peak in a wavelength range of approximately 400 to 500 nm; a layer selectively reflecting green light having a peak in a wavelength range of approximately 500 to 600 nm; and a layer selectively reflecting red light having a peak in a wavelength range of approximately 600 to 700 nm. A light absorption layer is provided opposite to an external light incident side, whereby (1) three cholesteric liquid crystal display layers all become the selective reflection state and white is displayed by additive color mixture, (2) the three cholesteric liquid crystal display layers all become the transparent state and light transmitting through the three cholesteric liquid crystal display layers is all absorbed in the light absorption layer and black is displayed, (3) only one of the three cholesteric liquid crystal display layers becomes the selective reflection state and red, green, or blue is displayed, or (4) only two of the three cholesteric liquid crystal display layers become the selective reflection state and two of yellow, magenta, and cyan are displayed wherein the two layers include a layer whose threshold voltage is in the middle of those of other two layers, so that a total of seven colors—five colors, black, white, red, green, and blue, and two of yellow, magenta, and cyan—can be displayed within one pixel.

Since a maximum reflectance of 50% is obtained in a peak wavelength range in the selective reflection phenomenon by cholesteric liquid crystals, a high integral reflectance can be obtained in a display of white, yellow, magenta, and cyan represented by additive color mixture, as well as in a display of the primary colors such as blue, green, and red, so that a bright and high-contrast display can be obtained.

Furthermore, a brighter display can be obtained by forming the three display layers such that each of them is constituted of two display layers which selectively reflect a mutually identical color and are opposite to each other in the helical twisting direction of the cholesteric liquid crystals.

Furthermore, a full color display can be obtained by applying area modulation method such as dithering and the error diffusion method, using at least five colors, for example, white, black, blue, green, and red.

A storage medium according to this invention has no internal electrodes and wires for applying a voltage or has a common electrode only in one substrate and requires no internal drive circuit. Thus, the storage medium can be manufactured inexpensively and can be structurally lightweight, thin, and flexible.

As described above, according to this invention, there is provided a paper-like storage medium which has a high-speed rewrite capability by electro-optical response of cholesteric liquid crystals and memory capability without power. The storage medium is capable of a bright and high-contrast black-and-white monochrome display or full color display, is structurally lightweight, thin, and flexible, and is inexpensive to manufacture.

BRIEF DESCRIPTION OF THE DRAWINGS

The preferred embodiments of this invention will be described in detail, with reference to the following figures, wherein like numerals represent like elements, and wherein:

FIGS. 7(A)–7(B) shows examples of a write signal of an image writing method according to the present invention;

FIG. 8 shows alignment states of the display layers of a storage medium during electro-optical response shown in FIG. 6 according to the image writing method shown in FIG. 7;

FIG. 12 shows alignment states of the display layers of a storage medium during electro-optical response shown in FIG. 10 according to the image writing method shown in FIG. 11;

FIG. 14 shows applied voltages and displayed colors when a display is written to the storage medium according to the first embodiment;

FIG. 15 shows applied voltages and displayed colors when a display is written to the storage medium according to the second embodiment;

FIG. 16 shows applied voltages and displayed colors when a display is written to the storage medium according to the method of FIG. 11;

DETAILED DESCRIPTION OF PREFERRED EMBODIMENTS

Figure 1:
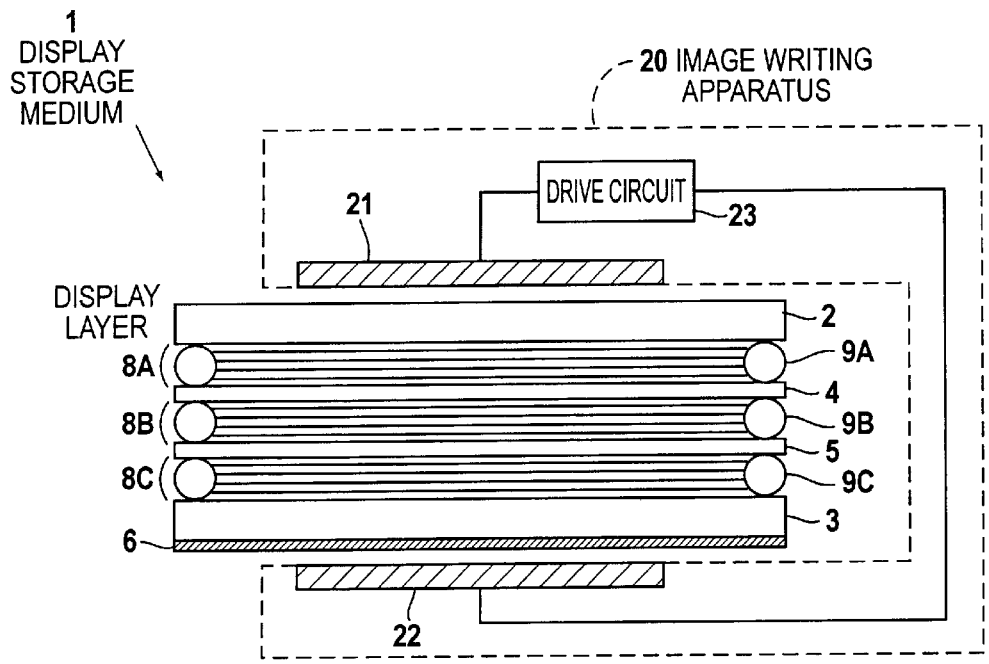
FIG. 1 shows a first embodiment of a storage medium and an image writing apparatus according to the present invention.

FIG. 1 shows a first embodiment of a storage medium and an image writing apparatus according to this invention.

A storage medium 1, in this embodiment, has three display layers 8A, 8B, and 8C stacked between substrates 2 and 3. The three display layers each comprise cholesteric liquid crystals or the like, selectively reflecting mutually different wavelengths of electromagnetic radiation with spacers 9A, 9B, and 9C inserted in the display layers 8A, 8B, and 8C, respectively and a separation substrate 4 intervening between the display layers 8A and 8B and a separation substrate 5 intervening between the display layers 8B and 8C. For example, the display layers may reflect different wavelengths of infrared, visible and ultraviolet light. The following preferred embodiments, for simplicity of the description, will assume that the display layers reflect colors in visible light. The storage medium 1 also has a light absorption layer 6 provided on the back of a substrate 3 opposite to the external light incident side.

Substrates 2 and 3 can be comprised of glass, silicone, polymer film, polyethylene, polystyrene, polyethylene terephthalate, polyvinyl alcohol, polycarbonate, polyvinyl chloride, polyimide, polyamide, and polysulfone, and the like. Therefore at least the substrate 2 of the external light incident side, is made of material having light transparent capability.

The substrates 2 and 3 may be, for example, from several tens of micromillimeters to several hundreds of micromillimeters in thickness and have both self-supporting capability and flexibility. Additionally, the substrates 2 and 3 may have large dielectric constants to, thereby, increase the ratio of voltages to the display layers 8A, 8B, and 8C. As required, there may be formed on the surface thereof a known functional film such as, for example, a liquid crystal alignment layer, a wear-resistant layer, and a barrier layer for preventing invasion of gas to the storage medium 1.

The separation substrates 4 and 5 permit use of the same polymer films as used for the substrates 2 and 3 and are made of material having a light transparent capability. They may be, for example, from several micromillimeters to several tens of micromillimeters in thickness and have flexibility. Also, they may have large dielectric constants to, thereby, increase the ratio of voltages to the display layers 8A, 8B, and 8C like the substrates 2 and 3. As required, there may be formed on the surface of the separation specification substrates 4 and 5, a known functional film such as, for example, a liquid crystal alignment layer and the like.

Ball-type or cylinder-type spacers made of glass, plastic, or the like can be used as the spacers 9A, 9B, and 9C. The spacers 9A, 9B and 9C control the thickness of the display layers 8A, 8B, and 8C to from several micromillimeters to several tens of micromillimeters, respectively. Particularly, when material having flexibility is used for the substrates 2 and 3, to prevent the thickness of the display layers 8A, 8B, and 8C from largely changing due to deformation of the substrates 2 and 3, it is desirable to bond the substrates to each other using the spacers 9A, 9B, and 9C coated with an adhesive.

As alternatives to the spacers 9A, 9B, and 9C, protrusions capable of controlling the thickness of the display layers 8A, 8B, and 8C can be formed on the surface of the substrates 2 and 3 and the separation substrates 4 and 5.

The light absorption layer 6 is any type of material that absorbs incident light transmitting through the display layers 8A, 8B, and 8C. For example, a polymer film containing a pigment such as carbon black can be used for the light absorption layer 6.

Instead of forming the light absorption layer 6 on the back of the substrate 3 opposite to the external light incident side, the light absorption layer 6 may be formed between the substrate 3 and the display layer 8C formed on the substrate 3. Alternatively, the substrate 3 may be pigmented with a black dye or the like to provide a light absorption capability for the substrate 3, so that the light absorption layer 6 can be omitted.

The cholesteric liquid crystals constituting the display layers 8A, 8B, and 8C may be comprised of cholesterol derivatives, nematic liquid crystals having positive dielectric anisotropy, such as Schiff base family, azo family, azoxy family, biphenyl family, terphenyl family, benzoate family, tolan family, pyrimidine family, cyclohexane carvone acid ester family, phenyl cyclohexane family, and dioxane family, a mixture of cholesterol derivatives, or a mixture of nematic liquid crystals. Additionally, the cholesterol derivatives, nematic liquid crystals, cholesterol derivative mixtures, and nematic liquid crystal mixtures are doped with a chiral dopant with asymmetry carbon, such as ester derivatives, cyano biphenyl derivatives, bis-anneal derivatives and the like.

The helical pitch of the cholesteric liquid crystal is adjusted by the amount of a chiral dopant added to nematic liquid crystals. For example, adjustments are made so that the central wavelength of selective reflection light of the display layers 8A, 8B, and 8C falls within the range of approximately 400 to 500 nm, 500 to 600 nm, and 600 to 700 nm.

To compensate for the temperature dependence of helical pitch of cholesteric liquid crystal, a known method may also be used which adds a plurality of chiral dopants which are different in a twisting direction or exhibit reverse temperature dependence.

The image writing apparatus 20, which is formed separately from the storage medium 1 in this embodiment, comprises the write electrodes 21 and 22 sandwiching the storage medium 1 and a drive circuit 23 for applying write signals between the electrodes 21 and 22. The drive circuit 23 comprises a drive power supply and a control section (not shown) which controls signals applied between the electrodes 21 and 22, based on inputted image data.

The image writing apparatus 20 has a gap equal to the thickness of the storage medium 1 between the electrodes 21 and 22, for example. The image writing apparatus 20 can be constructed such that, during image writing, it inserts the storage medium 1 to a proper position in the gap to write an image to the storage medium 1. Alternatively, the image writing apparatus 20 can be constructed such that, during image writing, with the electrode 21 arranged in an open/close relation to the electrode 22, it opens the electrode 21 to insert the storage medium 1 to a proper position, and then closes the electrode 21 to write an image to the storage medium 1.

The image writing apparatus 20 according to this invention is any type device that can apply a write signal to the storage medium 1 of this invention by an image writing method according to this invention from the outside. For example, the writing apparatus 20 may be a pen type device having electrodes of pixel size, a writing apparatus of line scan writing type having electrodes arranged one-dimensionally, a writing apparatus of surface writing type having electrodes arranged two-dimensionally, a writing apparatus having one of these configurations which generates an ion beam, and the like.

Figure 2:
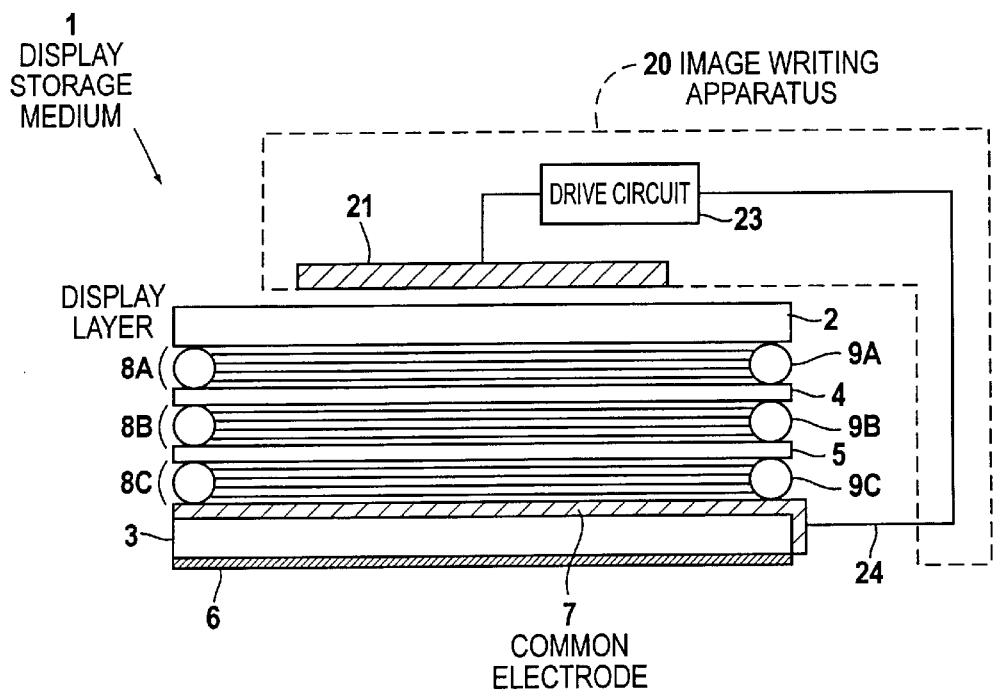
FIG. 2 shows a second embodiment of a storage medium and an image writing apparatus according to the present invention.

Although the above-mentioned embodiment shown in FIG. 1 describes the case where the storage medium 1 has no internal electrodes and wires for applying a voltage, a common electrode 7 can also be provided in one substrate of the storage medium 1, as in a second embodiment shown in FIG. 2.

It is desirable that the common electrode 7 be formed inside one substrate, e.g., inside the substrate 3 opposite to the external light incident side, namely, between the substrate 3 and the display layer 8C.

In this case, the storage medium 1 is provided with a contact 24 which is in contact with and is electrically connected with the common electrode 7. A write signal is applied between the writing electrode 21 of the image writing apparatus 20 and the common electrode 7 of the storage medium 1 during image writing.

The common electrode 7 can also be formed inside the substrate 2 of the external light incident side, namely, between the substrate 2 and the display layer 8A. However, in this case, since an image will be written from a side opposite to an observation side, a mirror image of the image to be observed must be written.

Although the embodiments in FIGS. 1 and 2 describe the case where the display layers 8A, 8B, and 8C have an LC structure consisting of cholesteric liquid crystals, the display layers 8A, 8B, and 8C can also have a PNLC (Polymer Network Liquid Crystal) structure containing mesh polymers in a continuous phase of cholesteric liquid crystal or a PDLC (Polymer Dispersed Liquid Crystal) structure in which cholesteric liquid crystals are dispersed like droplets in a polymer matrix. By putting the display layers 8A, 8B, and 8C into the PNLC or PDLC structure, an anchoring effect occurs in the interface between a cholesteric liquid crystal and a polymer, and the planar texture or focal conic texture in an electric-field-free state could be held more stable.

The PNLC structure and the PDLC structure can be formed by known methods of phase-separating a polymer and a cholesteric liquid crystal. For example, the PIPS (Polymerization Induced Phase Separation) method which mixes a polymer precursor, polymerized by heat and light, and a liquid crystal and causes phase separation by polymerization from a homogeneous state; the emulsion method, which mixes and stirs a polymer having low liquid crystal solubility, such as polyvinyl alcohol and a liquid crystal, and disperses the liquid crystal like droplet in the polymer; the TIPS (Thermally Induced Phase Separation) method, which mixes a thermoplastic polymer and a liquid crystal and causes phase separation by cooling from a state heated to a homogeneous state; and the SIPS (Solvent Induced Phase Separation) method, which dissolves a polymer and a liquid crystal in a solvent and puts the polymer and the liquid crystal into phase separation by evaporating the solvent may be used. Other types of manufacturing methods may also be employed without departing from the spirit and scope of the present invention.

When the display layers 8A, 8B, and 8C are put into the PDLC structure, since the respective cholesteric liquid crystals of the display layers 8A, 8B, and 8C are surrounded by a polymer and would not blend with each other even without providing the separation substrates 4 and 5, part or all of the separation substrates 4 and 5 can be omitted. When the PDLC structure is formed using a coating method which is capable of defining a film thickness, such as, for example, the bar coat method, the spin coat method, and the roll coat method, part or all of the spacers 9A, 9B, and 9C can be omitted.

Figure 3:
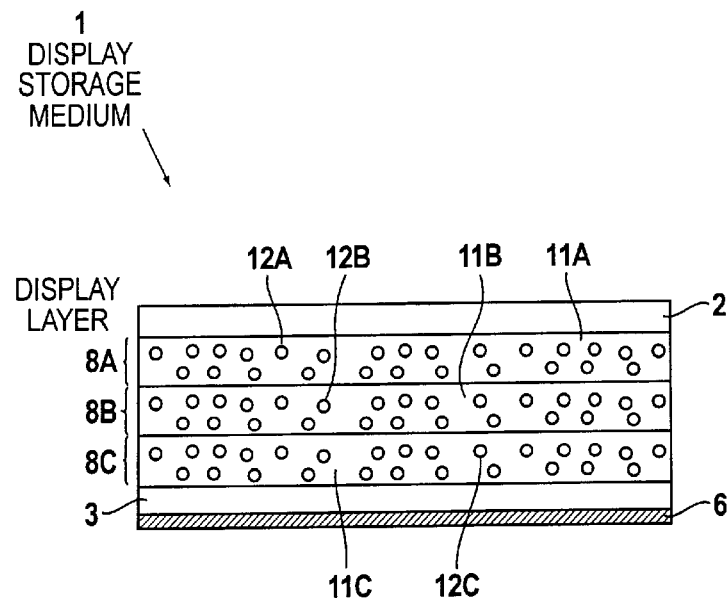
FIG. 3 shows a third embodiment of a storage medium according to the present invention.

FIG. 3 shows a third embodiment of the storage medium 1 when each of the display layers 8A, 8B, and 8C is thus put into the PDLC structure. The display layers 8A, 8B, and 8C, which have cholesteric liquid crystals 12A, 12B, and 12C dispersed like droplets in the polymer matrixes 11A, 11B, and 11C, respectively, are stacked on top of each other without spacers being inserted in the display layers 8A, 8B, and 8C and without a separation substrate intervening between the display layers 8A and 8B and between the display layers 8B and 8C.

The common electrode 7 can also be provided within the storage medium 1, as shown in FIG. 2, when each of the display layers 8A, 8B, and 8C is put into the PDLC structure or the PNLC structure.

Figure 5:
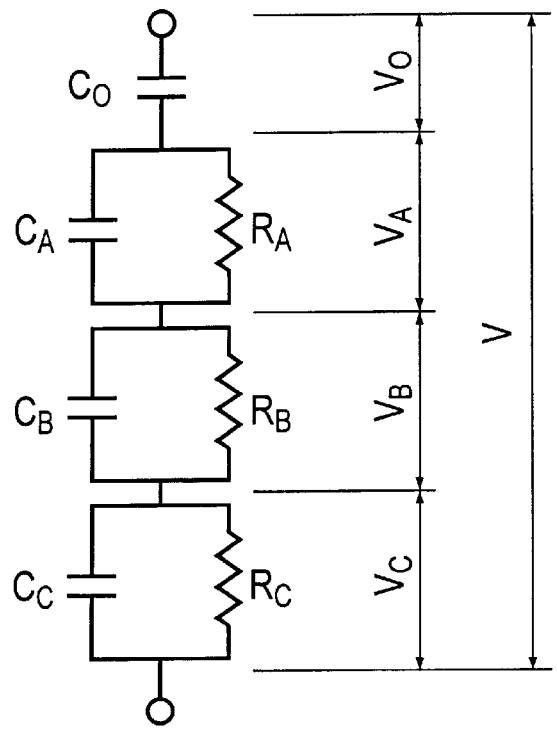
FIG. 5 shows a circuit of a storage medium according to the present invention.

FIG. 5 shows a circuit equivalent of the storage medium 1 according to the present invention shown in FIGS. 1, 2, and 3. In FIG. 5, Co, which denotes the equivalent capacitance of components except the display layers, indicates the respective capacitance series sum of substrates 2 and 3, and separation substrates 4 and 5 in the embodiment shown in FIG. 1, substrate 2 and separation substrates 4 and 5 in the embodiment shown in FIG. 2, and substrates 2 and 3 in the embodiment shown in FIG. 3.

Vo indicates voltage drop that occurs in components except the display layers when a voltage V is applied to the storage medium 1 from an external image writing apparatus 20. Furthermore, $C_A$, $C_B$, and $C_C$, and $R_A$, $R_B$, and $R_C$ indicate the capacitance and resistance values of the display layers 8A, 8B, and 8C, respectively. $V_A$, $V_B$, and $V_C$ indicate voltages actually applied to the display layers 8A, 8B, and 8C, respectively, when a voltage V is applied to the storage medium 1 from the external image writing apparatus 20.

Normally, since the resistance values $R_A$, $R_B$, and $R_B$ of the display layers 8A, 8B, and 8C are sufficiently large, voltages $V_A$, $V_B$, and $V_C$ applied to the display layers 8A, 8B, and 8C are as represented by the following expressions below.

$$V_A = (C_B C_C Co/C)/V \quad (1)$$

$$V_B = (C_A C_C Co/C)/V \quad (2)$$

$$V_C = (C_A C_B Co/C)/V \quad (3)$$

where $$C = C_A C_B C_C + C_A C_B Co + C_A C_C Co + C_B C_C Co \quad (4)$$

When a voltage is thus applied to the storage medium 1, according to the present invention, from the external image writing apparatus 20, a voltage obtained by the divided capacitance as described above is applied to each of the display layers 8A, 8B, and 8C, and the alignment state of cholesteric liquid crystals of each of the display layers 8A, 8B, and 8C changes in accordance with the applied voltage.

Accordingly, in the storage medium 1 according to this invention, by controlling the ratio of distribution of a "pseudo voltage" applied from the external image writing apparatus 20 to the display layers 8A, 8B, and 8C and the electro-optical response of the display layers 8A, 8B, and 8C for voltages actually applied, the electro-optical response of the display layers 8A, 8B, and 8C for a voltage applied from the external image writing apparatus 20 can be set as desired.

More specifically, the former distribution ratio to the display layers 8A, 8B, and 8C can be controlled by the ratio of capacitance of the display layers 8A, 8B, and 8C, as described above. The latter electro-optical response of the display layers 8A, 8B, and 8C can be controlled by the dielectric anisotropy, elastic modulus, and helical pitch of cholesteric liquid crystals constituting each of the display layers 8A, 8B, and 8C. When a polymer is added, the degree of the anchoring effect in the interface between the polymer and crystal liquids which is influenced by the polymer structure, phase separation process, and the like may be used to control the switching behavior.

Figure 6:
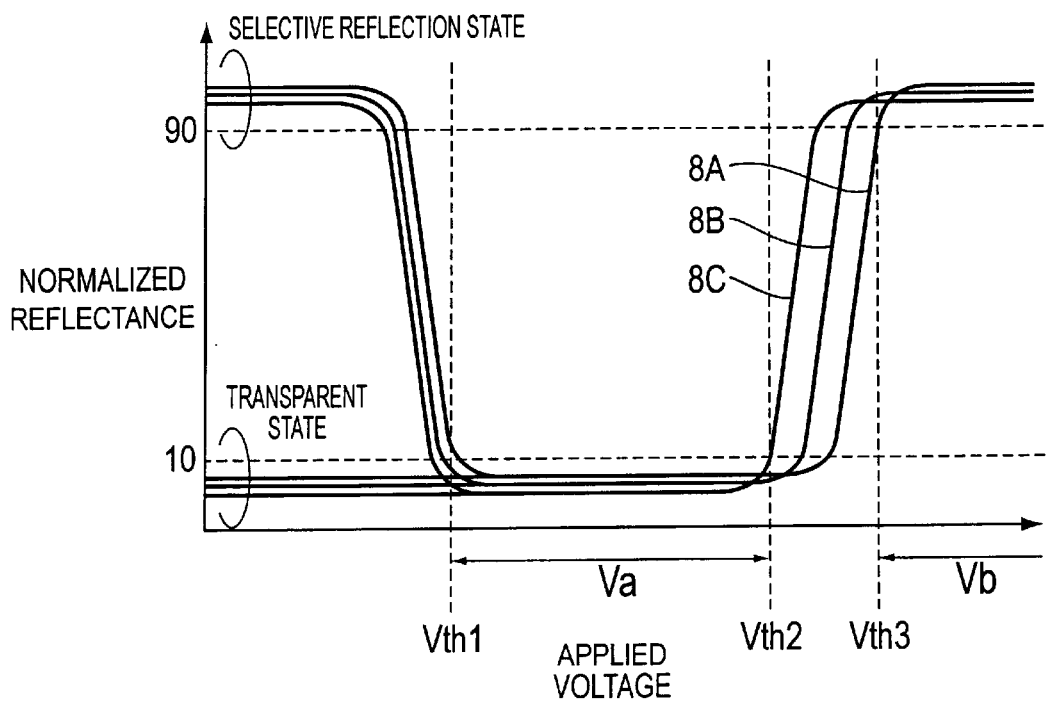
FIG. 6 shows the electro-optical response of one example of a storage medium according to the present invention.

FIG. 6 shows the electro-optical response of the display layers 8A, 8B, and 8C for a voltage applied from the external image writing apparatus 20.

The storage medium of this example is constructed so as to have a relation of Vth1<Vth2, wherein Vth1 is the largest threshold voltage Vpf 10 of texture change of the respective planar texture and focal conic texture of the three display layers 8A, 8B, and 8C, and Vth2 is the smallest threshold voltage Vpf 10 of texture change of the respective focal conic texture and homeotropic texture of the three display layers 8A, 8B, and 8C. A voltage between the Vth1 and Vth2 is Va and a voltage greater than or equal to the largest value Vth3 of threshold voltage Vfh 90 of texture change of the respective focal conic texture and homeotropic texture of the three display layers 8A, 8B, and 8C is Vb.

A write signal is applied to the storage medium from the external image writing apparatus 20, with the voltage Vs in an AC pulse select stage Ts during a write signal which is determined from the above-mentioned voltages Va and Vb based on input data, wherein the write signal consists of the select stage Ts and a subsequent voltage-free display Td as shown in FIG. 7(A), or with the voltage Vs in a DC pulse select stage Ts during a write signal which is determined from the above-mentioned voltages Va and Vb based on input data, wherein the write signal consists of the select stage Ts and a subsequent voltage-free display stage Td as shown in FIG. 7(B).

FIG. 8 shows a texture change of the three display layers 8A, 8B, and 8C by a select voltage Vs in this case, wherein "p" indicates selective reflection by the planar texture and "f" indicates transparent by the focal conic texture; they are shown in the order of the three display layers 8A, 8B, and 8C.

Figure 9:
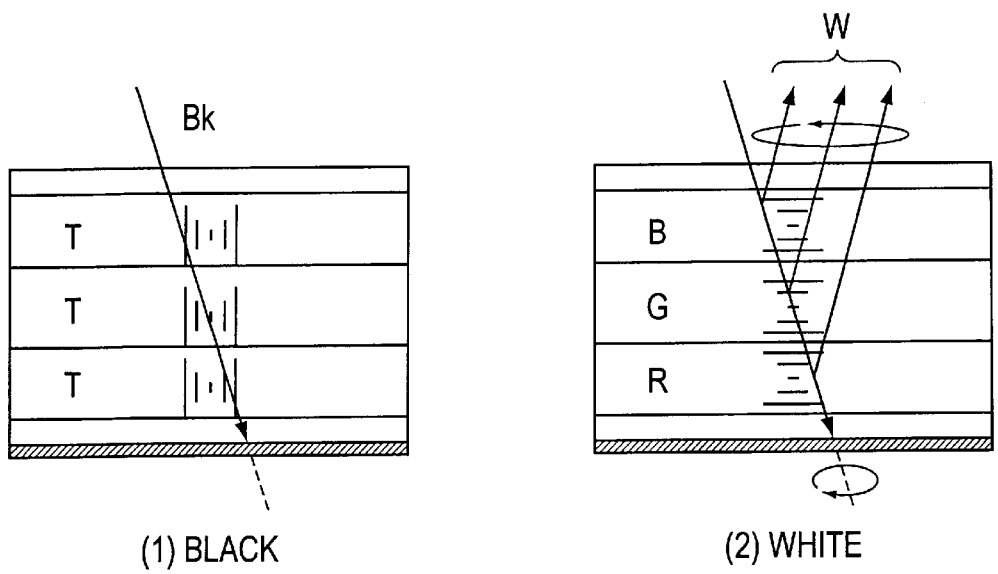
FIG. 9 shows display states of a storage medium during electro-optical response shown in FIG. 6 according to the image writing method shown in FIG. 7.

As apparent from the above, according to the above-mentioned storage medium and image writing apparatus, the following two types of alignment states are obtained:

(1) State in which all the three layers are the planar texture (2) State in which all the three layers are the focal conic texture Accordingly, for example, when the storage medium is constructed so that the display layers 8A, 8B, and 8C selectively reflect blue, green, and red, respectively, the following two display states can occur as shown in FIG. 9 ("T" in the figure indicates that a corresponding layer is in transparent by the focal conic texture) and two colors, black and white, can be displayed within one pixel: (1) white (W) is displayed by a write signal with Vs=Vb, and (2) black (Bk) is displayed by a write signal with Vs=Va.

Furthermore, a multi-level monochrome display can be performed by applying area modulation method such as dithering and the error diffusion method. The display layers for selectively reflecting green, blue, and red can be stacked in any order without being limited to the above example.

Figure 10:
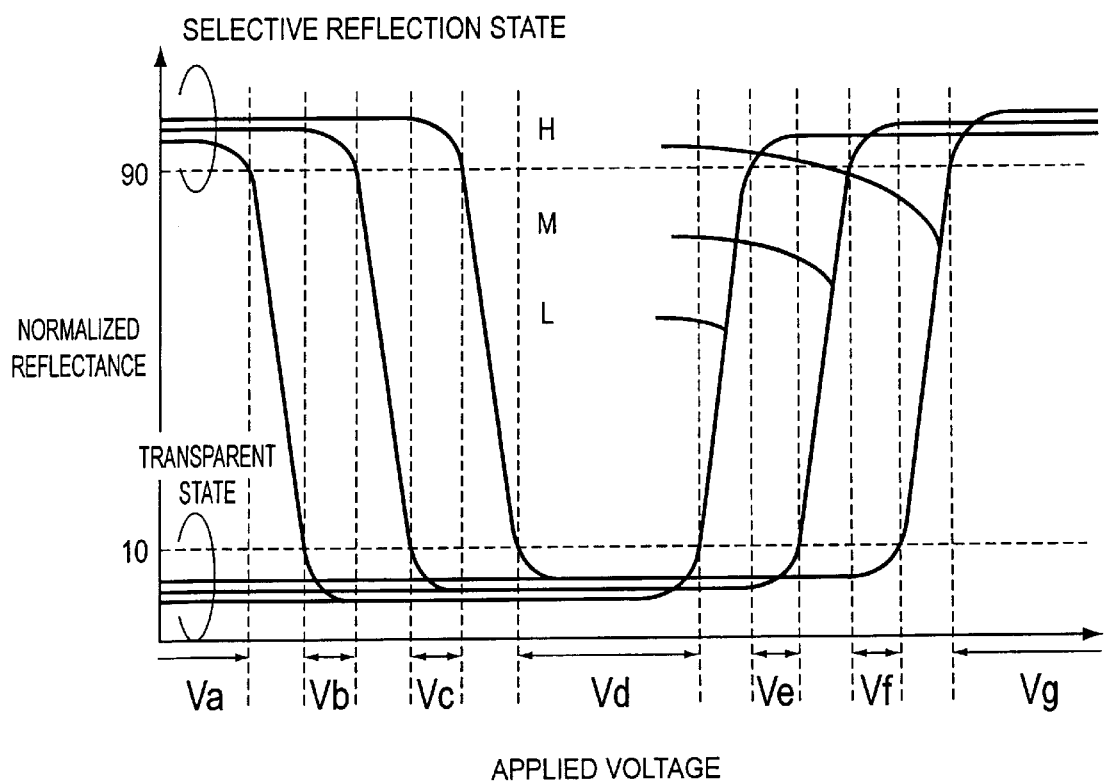
FIG. 10 shows the electro-optical response of another example of a storage medium according to the present invention.

FIG. 10, as another example of the storage medium 1 according to this invention, shows the electro-optical response of the display layers 8A, 8B, and 8C for voltage applied by the external image writing apparatus 20.

The storage medium of this example is constructed so that a transition region between the states of the planar texture and focal conic texture and a transition region between the states of the focal conic texture and homeotropic texture do not exist with the same applied voltage. When the highest, medium, and lowest of threshold voltage of the three display layers 8A, 8B, and 8C are defined as H, M, and L, respectively, voltages Va, Vb, Vc, Vd, Ve, Vf, and Vg are defined as follows:

Va: Voltage of Vpf 90 or less of L layer

Vb: Voltage between Vpf 10 of L layer and Vpf 90 of M layer

Vc: Voltage between Vpf 10 of M layer and Vpf 90 of H layer

Vd: Voltage between Vpf 10 of H layer and Vfh 10 of L layer

Ve: Voltage between Vfh 90 of L layer and Vfh 10 of M layer

Vf: Voltage between Vfh 90 of M layer and Vfh 10 of H layer

Vg: Voltage of Vfh 90 or more of H layer.

Figure 11A:
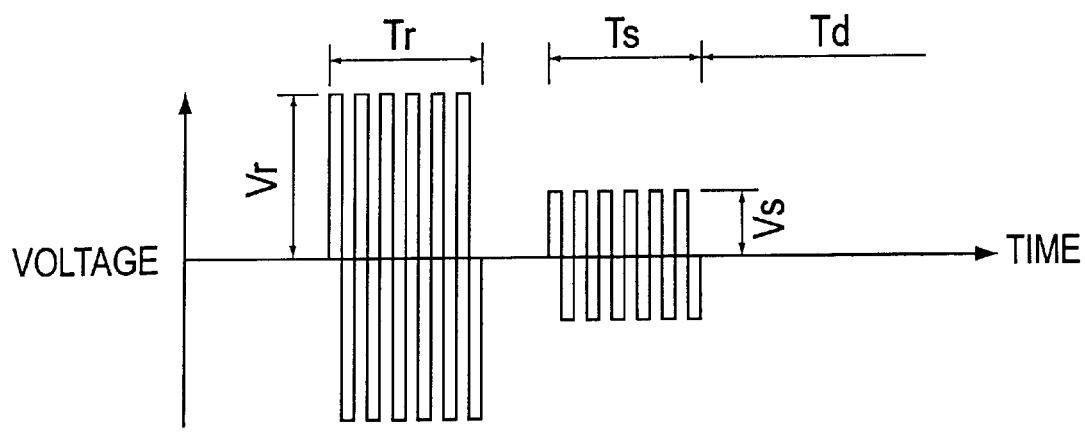
FIGS. 11(A)–11(B) show examples of a write signal of an image writing method according to the present invention.
Figure 11B:
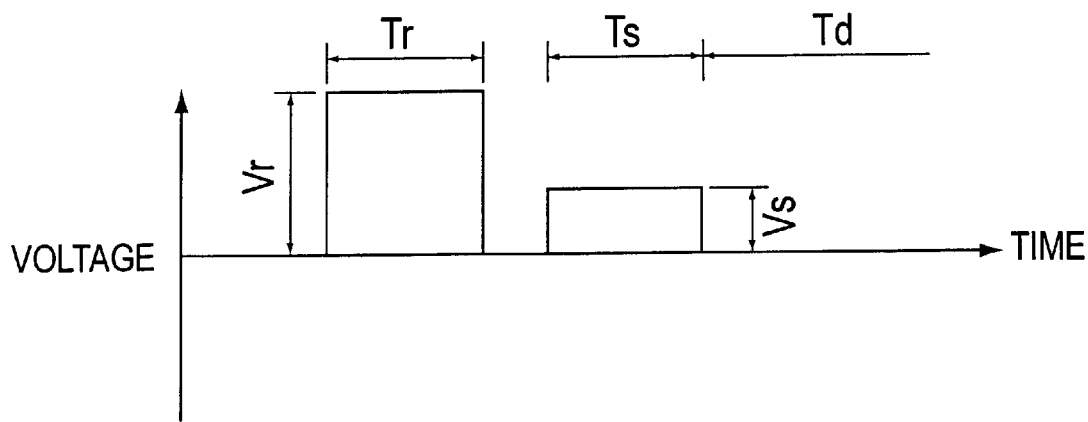

A write signal is applied to the storage medium from the external image writing apparatus 20, with a voltage having a relation of Vr>Vs, wherein the voltage is selected from the above-mentioned seven levels of voltage, Va to Vg. The seven levels of voltage, Va to Vg, which are produced based on input data, and Vr and Vs are the voltages in an AC pulse refresh stage Tr and a select stage Ts of a write signal, respectively, which includes the AC pulse refresh stage Tr, the select stage Ts, and a subsequent electric-field-free display stage Td, as shown in FIG. 11(A), or with a voltage having a relation of Vr>Vs, wherein the voltage is selected from the above-mentioned seven levels of voltage, Va to Vg, which are produced based on input data, and Vr and Vs are the voltages in a DC pulse refresh stage Tr and a select stage Ts of a write signal, respectively, which includes the DC pulse refresh stage Tr, the select stage Ts, and a subsequent electric-field-free display stage Td, as shown in FIG. 11(B).

FIG. 12 shows a texture change of the H, M, and L layers by a combination of a refresh voltage Vr with a select voltage Vs. In this case, "p" indicates selective reflection by the planar texture, "f" indicates transparent by the focal conic texture, and "?" indicates an undecided state depending on a state before application of a write signal. They are shown in the order of the L, M, and H layers.

As is apparent from the above, according to the above-mentioned storage medium and image writing apparatus, the following seven types of alignment states are obtained:

(1) a state in which all the H, M, and L layers are the planar texture;

(2) a state in which all the H, M, and L layers are the focal conic texture;

(3) a state in which the H layer is the planar and the M and L layers are the focal conic texture;

(4) a state in which the M layer is the planar texture and the H and L layers are the focal conic texture;

(5) a state in which the L layer is the planar texture and the H and M layers are the focal conic texture;

(6) a state in which the H and M layer is the planar texture and the L layer is the focal conic texture; and (7) a state in which the M and L layers are the planar texture and the H layer is the focal conic texture.

Figure 13:
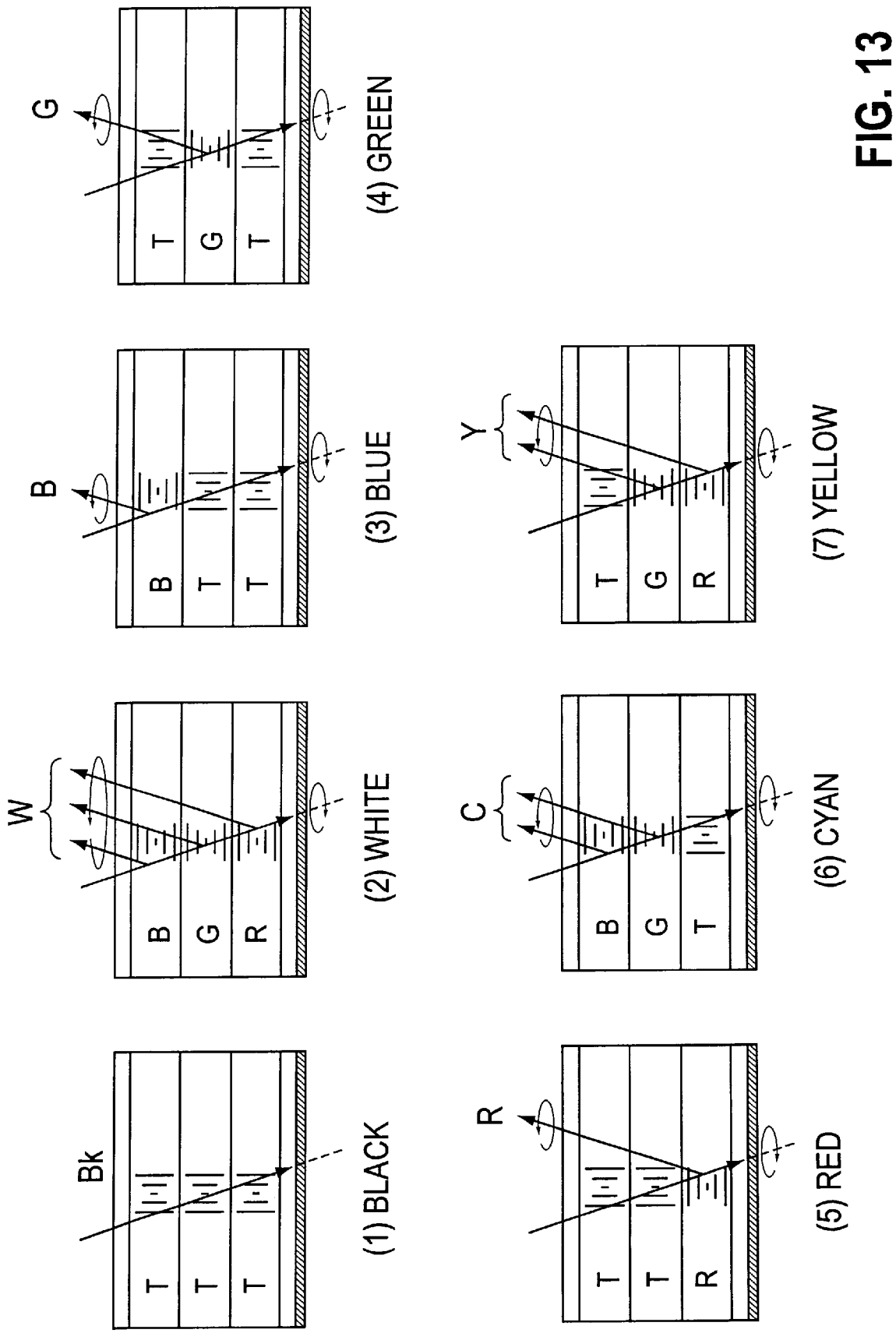
FIG. 13 shows display states of a storage medium during electro-optical response shown in FIG. 10 according to the image writing method shown in FIG. 11.

Accordingly, when the storage medium is constructed so that the display layer 8A serves as the H layer selectively reflecting blue, the display layer 8B as the M layer selectively reflecting green, and the display layer 8C as the L layer selectively reflecting red, the following seven display states, for example, can occur as shown in FIG. 13 ("T" in the figure indicates that a corresponding layer is in transparent by the focal conic texture):

(1) white (W) is displayed by a write signal with Vr=Vg and Vs=Va;

(2) black (Bk) is displayed by a write signal with Vr=Vd and Vs=Va, for example;

(3) blue (B) is displayed by a write signal with Vr=Vg and Vs=Vc;

(4) green (G) is displayed by a write signal with Vr=Vf and Vs=Vb;

(5) red (R) is displayed by a write signal with Vr=Ve and Vs=Va, for example;

(6) cyan (C) is displayed by a write signal with Vr=Vg and Vs=Vb; and (7) yellow (Y) is displayed by a write signal with Vr=Vf and Vs=Va.

A total of seven colors—five colors, black, white, blue, green, and red, and two colors, cyan and yellow—can be displayed within one pixel.

Furthermore, a full color display can be obtained by applying area modulation method such as dithering and the error diffusion method, using, for example, five colors, white, black, blue, green, and red.

In the above example, the M layer is used as a display layer selectively reflecting green, and cyan and yellow are displayed as two of three colors, cyan, magenta, and yellow. However, when the M layer is used as a display layer selectively reflecting blue, then cyan and magenta can be displayed as two of two of three colors, cyan, magenta, and yellow, and when the M layer is used as a display layer selectively reflecting red, then magenta and yellow can be displayed as two of three colors, cyan, magenta, and yellow.

The order of stacking display layers selectively reflecting blue, green, and red, or the magnitude of threshold voltages can be set arbitrarily without being limited to the above example.

Figure 4:
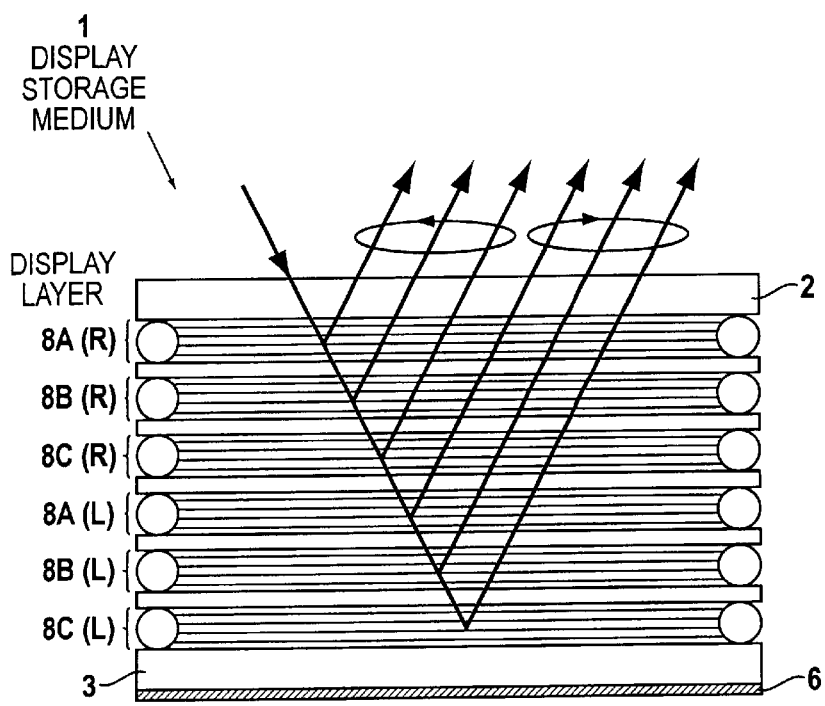
FIG. 4 shows a fourth embodiment of a storage medium according to the present invention.

In the embodiments shown in FIGS. 1, 2, or 3, the display layers 8A, 8B, and 8C reflectively reflect circularly polarized light components of a rotation direction matching the helical twisting direction of the respective cholesteric liquid crystals. However, as in a fourth embodiment of the storage medium as shown in FIG. 4, the display layers 8A, 8B, and 8C may be formed respectively by the display layers 8A(R), 8B(R), and 8C(R), and the display layers 8A(L), 8B(L), and 8C(L) which selectively reflect a mutually identical color and exhibit the same electro-optical response for a field applied from the external image writing apparatus 20. The former display layers consist of cholesteric liquid crystals of a clockwise helical twisting direction and the latter display layers consist of cholesteric liquid crystals of a counter-clockwise helical twisting direction. In this case, a monochrome display or color display of a higher reflectance can be obtained using the above-mentioned writing method. The display layers 8A(R), 8B(R), 8C(R), 8A(L), 8B(L), and 8C(L) can be stacked in any order without being limited to the example in FIG. 4.

In the fourth embodiment described in FIG. 4, spacers are inserted in each display layer, a separation substrate intervenes between display layers, and no electrode is provided within the storage medium 1. However, each of the display layers 8A, 8B, and 8C can be formed by two display layers as described above. Also, a common electrode 7 may be provided within the storage medium 1 as in the embodiment described in FIG. 2, and each display layer may be put into the PDLC structure as described in the third embodiment of FIG. 3.

As an example of the first embodiment, consider a storage medium of monochrome display of the PNLC structure. As a mixed solution of cholesteric liquid crystals of a display layer selectively reflecting red and a polymer precursor, 15 wt % thiolene system UV-curable polymer NOA65 (made by Norand Corporation), for example, is added to a solution which contains 69.0 wt % nematic liquid crystal BL012 (made by Merck Ltd.) having positive dielectric anisotropy, 15.5 wt % right-handed chiral dopant CB15 (made by Merck Ltd.), and 15.5 wt % right-handed chiral dopant CE2 (made by Merck Ltd.), for example.

As a mixed solution of cholesteric liquid crystals of a display layer selectively reflecting green and a polymer precursor, 15 wt % thiolene system UV-curable polymer NOA65 (made by Norand Products), for example, is added to a solution which contains 60.0 wt % nematic liquid crystal BL012 (made by Merck Ltd.) having positive dielectric anisotropy, 20.0 wt % right-handed chiral dopant CB15 (made by Merck Ltd.), and 20.0 wt % right-handed chiral dopant CE2 (made by Merck Ltd.), for example.

As a mixed solution of cholesteric liquid crystals of a display layer selectively reflecting blue and a polymer precursor, 15 wt % thiolene system UV-curable polymer NOA65 (made by Norand Products), for example, is added to a solution which contains 54.6 wt % nematic liquid crystal BL012 (made by Merck Ltd.) having positive dielectric anisotropy, 22.7 wt % right-handed chiral dopant CB15 (made by Merck Ltd.), and 22.7 wt % right-handed chiral dopant CE2 (made by Merck Ltd.), for example.

On top of a PET film Mylar (made by Toray Industries, Inc.) having a thickness of approximately 75 $\mu$m, adhesive spherical Spacer HAYABEADS L-21S (made by Hayakawa Rubber Co., Ltd.), for example, having a diameter of approximately 5 $\mu$m are wet-sprayed. The above-mentioned red mixed solution is dropped, and a PET film Mylar (made by Toray Industries, Inc.) having a thickness of approximately 4.5 $\mu$m, whose one side was wet-sprayed with adhesive spherical Spacer HAYABEADS L-21S (made by Hayakawa Rubber Co., Ltd.), for example, having a diameter of approximately 5 $\mu$m, is placed close enough so that the side, which was not sprayed with the spacer, is contacted by the Red mixed solution dropped side of the preceding film.

The above-mentioned green mixed solution is dropped on the top and a PET film Mylar (made by Toray Industries, Inc.), for example, having a thickness of approximately 4.5 $\mu$m, whose one side was wet-sprayed by adhesive spherical Spacer HAYABEADS L-21S (made by Hayakawa Rubber Co., Ltd.), for example, having a diameter of approximately 5 $\mu$m is placed close enough so that the other side, which was not sprayed with the spacer, is contacted on the Green mixed solution dropped side of the preceeding film. Also, on top of the PET film Mylar, the above-mentioned blue mixed solution is dropped, and a PET film Mylar (made by Toray Industries, Inc.) having a thickness of approximately 75 $\mu$m is placed close.

After the above processes are performed at approximately 60° C., the spacers and films are heated to 110° C. and then are left intact for about 30 minutes to bond the spacers and films. Then, the 60° C. environment is restored and UV light of approximately 50 mW/cm$^2$ (365 nm) filtering through a high pressure mercury lamp is irradiated for about 60 seconds. A black resin BKR-105 (made by Nippon Kayaku Co., Ltd.), for example, is applied to the back of the PET film substrate of the red display layer and is dried. Thus, a storage medium of monochrome display in which a blue display layer, a green display layer, and a red display layer, each with the PNLC structure are stacked in that order from an external light incident side, is produced.

With the produced storage medium sandwiched between a pair of aluminum electrodes connected to a pulse generator and high voltage power supply equipment, a write signal consisting of an AC select signal of approximately 50-Hz, 250-ms stage and an voltage-free display stage is applied. The storage medium is removed from between the electrodes and the displayed colors are observed. An example of the voltages of a select signal applied between the aluminum electrodes and the resulting displayed colors are shown in FIG. 14.

Even if the two colors were written repeatedly more than 1,000 times, no change is observed in displayed colors and the voltages of a select signal required for displays. The storage medium is sufficiently capable of keeping the displayed colors so that no change is observed in the displayed colors even after an elapse of 30 days or more. Further, the storage medium is approximately 200 μm or less in thickness and flexible.

As an example of the second embodiment, consider a storage medium of monochrome display having the PNLC structure which is different from the first embodiment in the cholesteric liquid crystals used and the stack order. As a mixed solution of cholesteric liquid crystals of a display layer selectively reflecting red and a polymer precursor, 15 wt % thiolene system UV-curable polymer NOA65 (made by Norand Corporation), for example, is added to a solution which contains 65.4 wt % nematic liquid crystal E48 (made by Merck Ltd.) having positive dielectric anisotropy, 17.3 wt % right-handed chiral dopant CB15 (made by Merck Ltd.), and 17.3 wt % right-handed chiral dopant CE2 (made by Merck Ltd.), for example.

As a mixed solution of cholesteric liquid crystals of a display layer selectively reflecting green and a polymer precursor, 15 wt % thiolene system UV-curable polymer NOA65 (made by Norand Corporation), for example, is added to a solution which contains 57.6 wt % nematic liquid crystal E48 (made by Merck Ltd.) having positive dielectric anisotropy, 21.2 wt % right-handed chiral dopant CB15 (made by Merck Ltd.), and 21.2 wt % right-handed chiral dopant CE2 (made by Merck Ltd.), for example.

As a mixed solution of cholesteric liquid crystals of a display layer selectively reflecting blue and a polymer precursor, 15 wt % thiolene system UV-curable polymer NOA65 (made by Norand Corporation), for example, is added to a solution which contains 51.0 wt % nematic liquid crystal E48 (made by Merck Ltd.) having positive dielectric anisotropy, 24.5 wt % right-handed chiral dopant CB15 (made by Merck Ltd.), and 24.5 wt % right-handed chiral dopant CE2 (made by Merck Ltd.), for example.

Thereafter, after the same processes as in the first embodiment are performed until irradiation of UV light, a black resin BKR-105 (made by Nippon Kayaku Co., Ltd.), for example, is applied to the back of the PET film substrate of the blue display layer and is dried. Thus, a storage medium of monochrome display in which a red display layer, a green display layer, and a blue display layer, each with the PNLC structure and stacked in that order from an external light incident side, is produced.

With the produced storage medium sandwiched between a pair of aluminum electrodes connected to a pulse generator and high voltage power supply equipment, a write signal consisting of a DC select signal of approximately 250-ms stage and an voltage-free display stage is applied. The storage medium is removed from between the electrodes and displayed colors are observed. An example of the voltages of a select signal applied between the aluminum electrodes and the resulting displayed colors are shown in FIG. 15.

Even if the two colors are written repeatedly more than 1,000 times, no change is observed in the displayed colors and the voltages of a select signal required for the displays. The storage medium is sufficiently capable of keeping the displayed colors so that no change is observed in the displayed colors even after an elapse of 30 days or more. Further, the storage medium is approximately 200 μm or less in thickness and flexible.

As an example of the third embodiment, consider a storage medium of monochrome display having a PNLC structure in which display layers selectively reflecting an identical color different in rotation direction are stacked as a mixed solution of cholesteric liquid crystals and a polymer precursor of a display layer selectively reflecting right-handed red, 15 wt % thiolene system UV-curable polymer NOA65 (made by Norand Corporation), for example, is added to a solution which contains 81.0 wt % nematic liquid crystal BL012 (made by Merck Ltd.) having positive dielectric anisotropy and 19.0 wt % right-handed chiral dopant CNL-611R (made by Asahi Denka Kogyo K. K.), for example.

As a mixed solution of cholesteric liquid crystals and a polymer precursor of a display layer selectively reflecting left-handed red, 15 wt % thiolene system UV-curable polymer NOA65 (made by Norand Corporation), for example, is added to a solution which contains 81.0 wt % nematic liquid crystal BL012 (made by Merck Ltd.) having positive dielectric anisotropy and 19.0 wt % left-handed chiral dopant CNL-611L (made by Asahi Denka Kogyo K. K.), for example.

As a mixed solution of cholesteric liquid crystals and a polymer precursor of a display layer selectively reflecting right-handed green, 15 wt % thiolene system UV-curable polymer NOA65 (made by Norand Corporation), for example, is added to a solution which contains 76.2 wt % nematic liquid crystal BL012 (made by Merck Ltd.) having positive dielectric anisotropy and 23.8 wt % right-handed chiral dopant CNL-611R (made by Asahi Denka Kogyo K. K.), for example.

As a mixed solution of cholesteric liquid crystals and a polymer precursor of a display layer selectively reflecting left-handed green, 15 wt % thiolene system UV-curable polymer NOA65 (made by Norand Corporation), for example, is added to a solution which contains 76.2 wt % nematic liquid crystal BL012 (made by Merck Ltd.) having positive dielectric anisotropy and 23.8 wt % left-handed chiral dopant CNL-611L (made by Asahi Denka Kogyo K. K.), for example.

As a mixed solution of cholesteric liquid crystals and a polymer precursor of a display layer selectively reflecting right-handed blue, 15 wt % thiolene system UV-curable polymer NOA65 (made by Norand Corporation), for example, is added to a solution which contains 73.7 wt % nematic liquid crystal BL012 (made by Merck Ltd.) having positive dielectric anisotropy and 26.3 wt % right-handed chiral dopant CNL-611R (made by Asahi Denka Kogyo K. K.), for example.

As a mixed solution of cholesteric liquid crystals and a polymer precursor of a display layer selectively reflecting left-handed blue, 15 wt % thiolene system UV-curable polymer NOA65 (made by Norand Corporation), for example, is added to a solution which contains 73.7 wt % nematic liquid crystal BL012 (made by Merck Ltd.) having positive dielectric anisotropy and 26.3 wt % left-handed chiral dopant CNL-611L (made by Asahi Denka Kogyo K. K.), for example.

Thereafter, after the same processes as in the first embodiment are performed for each of a right-handed mixed solution and a left-handed mixed solution until irradiation of UV light, a storage medium in which right-handed display layers are stacked, and a storage medium in which left-handed display layers are stacked is produced. The red display layer of the right-handed storage medium is bonded in opposed relation to the blue display layer of the left-handed storage medium. A black resin BKR-105 (made by Nippon Kayaku Co., Ltd.), for example, is applied to the back of a PET film substrate of the red display layer of the left-handed storage medium and is dried. Thus, there is produced a storage medium of monochrome display in which a right-handed blue display layer, green display layer, red display layer, and left-handed blue display layer, green display layer, and red display layer, each with the PNLC structure, are stacked in that order from an external light incident side.

As an example of the fourth embodiment, consider a storage medium of color display having an LC structure as cholesteric liquid crystals of a display layer selectively reflecting red, 68.6 wt % nematic liquid crystal ZLI4520 (made by Merck Ltd.) having positive dielectric anisotropy, 15.7 wt % right-handed chiral dopant CB15 (made by Merck Ltd.), and 15.7 wt % right-handed chiral dopant CE2 (made by Merck Ltd.), for example, are mixed.

As cholesteric liquid crystals of a display layer selectively reflecting green, 72.2 wt % nematic liquid crystal E186 (made by Merck Ltd.) having positive dielectric anisotropy, 13.9 wt % right-handed chiral dopant CB15 (made by Merck Ltd.), and 13.9 wt % right-handed chiral dopant CE2 (made by Merck Ltd.), for example, are mixed.

As cholesteric liquid crystals of a display layer selectively reflecting blue, 65.0 wt % nematic liquid crystal ZLI4389 (made by Merck Ltd.) having positive dielectric anisotropy, 17.5 wt % right-handed chiral dopant CB15 (made by Merck Ltd.), and 17.5 wt % right-handed chiral dopant CE2 (made by Merck Ltd.), for example, are mixed.

On top of a PET film Mylar (made by Toray Industries, Inc.) having a thickness of approximately 75 $\mu$m, adhesive spherical Spacer HAYABEADS L-21S (made by Hayakawa Rubber Co., Ltd.), for example, having a diameter of approximately 5 $\mu$m are wet-sprayed. The above-mentioned blue cholesteric liquid crystals are dropped and a PET film Mylar (made by Toray Industries, Inc.), for example, having a thickness of approximately 4.5 $\mu$m, whose one side is wet-sprayed by adhesive spherical Spacer HAYABEADS L-21S (made by Hayakawa Rubber Co., Ltd.), for example, having a diameter of approximately 5 $\mu$m, is placed close enough so that the other side, which is not sprayed with the spacer, is contacted by the blue liquid crystal dropped side of the of the preceding film.

Furthermore, the above-mentioned green cholesteric liquid crystals is dropped on the top and a PET film Mylar (made by Toray Industries, Inc.), for example, having a thickness of approximately 4.5 $\mu$m, whose one side is wet-sprayed by adhesive spherical Spacer HAYABEADS L-21S (made by Hayakawa Rubber Co., Ltd.), for example, having a diameter of approximately 5 $\mu$m, is placed close enough so that the other side, which is not sprayed with the spacer, is contacted by the Green liquid crystal dropped side of the proceeding film. Further, on top of this, the above-mentioned red cholesteric liquid crystals are dropped, and a PET film Mylar (made by Toray Industries, Inc.), for example, having a thickness of approximately 75 $\mu$m is placed close.

After the above processes are performed at room temperature, the spacers and films are heated to approximately 110° C. and then are left intact for about 30 minutes. A black resin BKR-105 (made by Nippon Kayaku Co., Ltd.), for example, applied to the back of the PET film substrate of the red display layer and is dried. Thus, a storage medium of color display in which a blue display layer, a green display layer, and a red display layer, each with the LC structure, are stacked in that order from an external light incident side, is produced.

As an example of a fifth embodiment, consider a storage medium of color display having a PNLC structure. As a mixed solution of cholesteric liquid crystals and a polymer precursor of display layers selectively reflecting red, green, and blue, respectively, 15 wt % thiolene system UV-curable polymer NOA65 (made by Norand Corporation), for example, is added to the cholesteric liquid crystals used in the fourth embodiment.

On top of a PET film Mylar (made by Toray Industries, Inc.), for example, having a thickness of approximately 75 $\mu$m, adhesive spherical Spacer HAYABEADS L-21S (made by Hayakawa Rubber Co., Ltd.), for example, having a diameter of approximately 5 $\mu$m are wet-sprayed, the above-mentioned red mixed solution is dropped, and a PET film Mylar (made by Toray Industries, Inc.), for example, having a thickness of approximately 4.5 $\mu$m, whose one side is wet-sprayed by adhesive spherical Spacer HAYABEADS L-21S (made by Hayakawa Rubber Co., Ltd.), for example, having a diameter of approximately 5 $\mu$m, is placed close so that the other side, which is not sprayed with the spacer, is contacted by the red mixed solution dropped side of the preceding film.

Furthermore, the above-mentioned green mixed solution is dropped on the top and a PET film Mylar (made by Toray Industries, Inc.), for example, having a thickness of approximately 4.5 $\mu$m, whose one side is wet-sprayed by adhesive spherical Spacer HAYABEADS L-21S (made by Hayakawa Rubber Co., Ltd.), for example, having a diameter of approximately 5 $\mu$m, is placed close enough so that the other side, which is not sprayed with the spacer, is contacted by the green mixed solution dropped side of the preceding film. Further, on top of this, the above-mentioned blue mixed solution is dropped, and a PET film Mylar (made by Toray Industries, Inc.), for example, having a thickness of approximately 75 $\mu$m is placed close.

After the above processes are performed at approximately 70° C., the spacers and films are heated to approximately 110° C. and then are left intact for about 30 minutes. Then, the 70° C. environment is restored and UV light of approximately 50 mW/cm$^2$ (365 nm) filtering through a high pressure mercury lamp is irradiated for about 60 seconds. A black resin BKR-105 (made by Nippon Kayaku Co., Ltd.), for example, is applied to the back of the PET film substrate of the red display layer and is dried. Thus, a storage medium of color display in which a blue display layer, a green display layer, and a red display layer, each with the PNLC structure, are stacked in that order from an external light incident side, is produced.

With the produced storage medium sandwiched between a pair of aluminum electrodes connected to a pulse generator and high voltage power supply equipment, a write signal consisting of an AC refresh signal of approximately 50-Hz, 250-ms stage, an AC select signal of 50-Hz, 250-ms stage, and an voltage-free display stage is applied. The storage medium is removed from between the electrodes and displayed colors are observed. As an example of the voltages of a refresh signal and a select signal applied between the aluminum electrodes and the resulting displayed colors are shown in FIG. 16.

Even if the seven colors are written repeatedly more than 1,000 times, no change is observed in displayed colors and the voltages of a refresh signal and a select signal required for the displays. The storage medium is sufficiently capable of keeping the displayed colors so that no change is observed in the displayed colors even after an elapse of 30 days or more. Further, the storage medium is approximately 200 $\mu$m or less in thickness and flexible.

As an example of a sixth embodiment, consider a storage medium of color display having a PNLC structure using polymer material different from that in the fifth embodiment. As mixed solutions of cholesteric liquid crystals and a polymer precursor of display layers selectively reflecting red, green, and blue, respectively, 15 wt % acrylate monomer HX-620 (made by Nippon Kayaku Co., Ltd.) and 2 wt % photoinitiator Darocur 1173 (made by Ciba Geigy, Inc.), for example, are added to the cholesteric liquid crystals used in the fourth embodiment.

By subsequently performing the same processes as in the fifth embodiment, a storage medium of color display in which a blue display layer, a green display layer, and a red display layer, each with the PNLC structure and stacked in that order from an external light incident side, is produced.

As an example of a seventh embodiment, consider a storage medium of color display having a PDLC structure produced by the PIPS method.

As mixed solutions of cholesteric liquid crystals and a polymer precursor of display layers selectively reflecting red, green, and blue, respectively, 30 wt % thiol family UV polymerization polymer precursor NOA65 (made by Norand Corporation), for example, is added to the cholesteric liquid crystals used in the fourth embodiment.

On top of a PET film Mylar (made by Toray Industries, Inc.), for example, having a thickness of approximately 50 $\mu$m, spherical spacers Micropearl SP210 (made by Sekisui Fine Chemical Co., Ltd.), for example, having a diameter of approximately 10 $\mu$m are wet-sprayed, the above-mentioned red mixed solution is dropped, and a PET film Mylar (made by Toray Industries, Inc.), for example, having a thickness of approximately 4.5 $\mu$m, whose one side is wet-sprayed by spherical spacers Micropearl SP210 (made by Sekisui Fine Chemical Co., Ltd.), for example, having a diameter of approximately 10 $\mu$m, is placed close enough so that the other side, which is not sprayed with the spacer, is contacted by the red mixed solution dropped side of the preceding film.

Furthermore, the above-mentioned green mixed solution is dropped on the top and a PET film Mylar (made by Toray Industries, Inc.), for example, having a thickness of approximately 4.5 $\mu$m, whose one side is wet-sprayed by spherical spacers Micropearl SP210 (made by Sekisui Chemical, Inc.) having a diameter of approximately 10 $\mu$m, is placed close enough so that the other side, which is not sprayed with the spacer, is contacted by the green mixed solution dropped side of the preceding film. Further, on top of this, the above-mentioned blue mixed solution is dropped, and a PET film Mylar (made by Toray Industries, Inc.), for example, having a thickness of approximately 50 $\mu$m is placed close.

After the above processes are performed at approximately 70° C., UV light of approximately 50 mW/cm$^2$ (365 nm) filtering through a high pressure mercury lamp is irradiated for about 60 seconds. Then, a black resin BKR-105 (made by Nippon Kayaku Co., Ltd.), for example, is applied to the back of the PET film substrate of the red display layer and is dried. Thus, a storage medium of color display in which a blue display layer, a green display layer, and a red display layer, each with the PDLC structure, are stacked in that order from an external light incident side, is produced.

As an example of an eighth embodiment, consider a storage medium of color display having a PDLC structure was produced by the emulsion method. Cholesteric liquid crystals used in the fourth embodiment which selectively reflect red, green, and blue, respectively, and 10 wt % aqueous solution of PVA (Wako Pure Chemicals Industries Ltd.) having a polymerization degree of 500, subjected to ion elimination by ethanol, for example, are mixed at a weight ratio of 1 to 2.5. The mixtures are stirred at 10,000 rpm for about three minutes by means of a high-speed rotor knife homogenizer (Omni, Inc.) and are deaerated using vacuum equipment, so that red, green, and blue emulsions are produced.

The emulsions, diluted to a concentration of 50% with water, are applied uniformly onto PET film Mylars (made by Toray Industries, Inc.), for example, each having a thickness of approximately 50 $\mu$m by means of a Doctor blade 005 (made by Gardner, Inc.), for example, and are dried at room temperature for about three hours. Thus, PDLC layers having a thickness of about 10 $\mu$m selectively reflecting red, green, and blue, respectively are formed on the films.

In a state in which the PDLC layer of the red display layer is overlaid on the PDLC layer of the green display layer so that their surfaces are opposite to each other, and the film on which the green display layer is formed is overlaid on the PDLC layer of the blue display layer so that the back of the former is opposite to the surface of the latter, pressure is applied using a roller in a state heated to approximately 80° C. and the three display layers are firmly bonded. A black resin BKR-105 (made by Nippon Kayaku Co., Ltd.), for example, is applied to the back of the PET film substrate of the red display layer and is dried. Thus, a storage medium of color display in which a blue display layer, a green display layer, and a red display layer, each with the PDLC structure, are stacked in that order from an external light incident side is produced.

For each of the display storage media in the first, second, and fifth embodiments, a reflection spectra of each displayed color against 100% for a Lambertian diff-user and a*b* chromaticity coordinates system is measured using an integrating spherical spectrophotometer CM-2022 (made by Minolta Co., Inc.).

Figure 17:
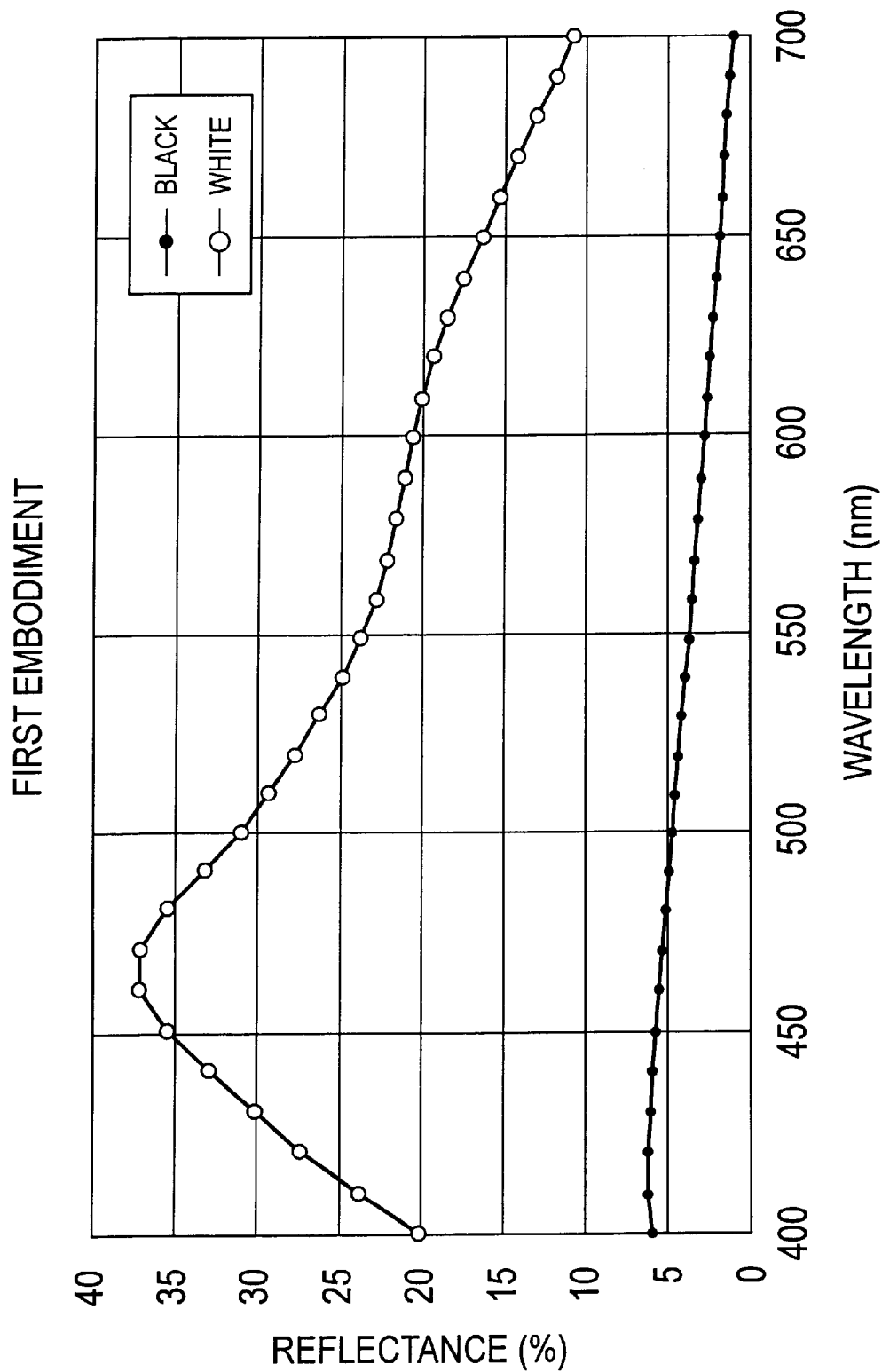
FIG. 17 shows a reflection spectra of the storage medium according to the first embodiment.

FIG. 17 shows an example of a reflection spectra of a storage medium of monochrome display according to the first embodiment. An integral reflectance at a white display was 36.9% for fine copy paper and 50.8% for newspaper, and a contrast ratio between black display and white display was 6.4, almost the same as that of newspaper.

Figure 18:
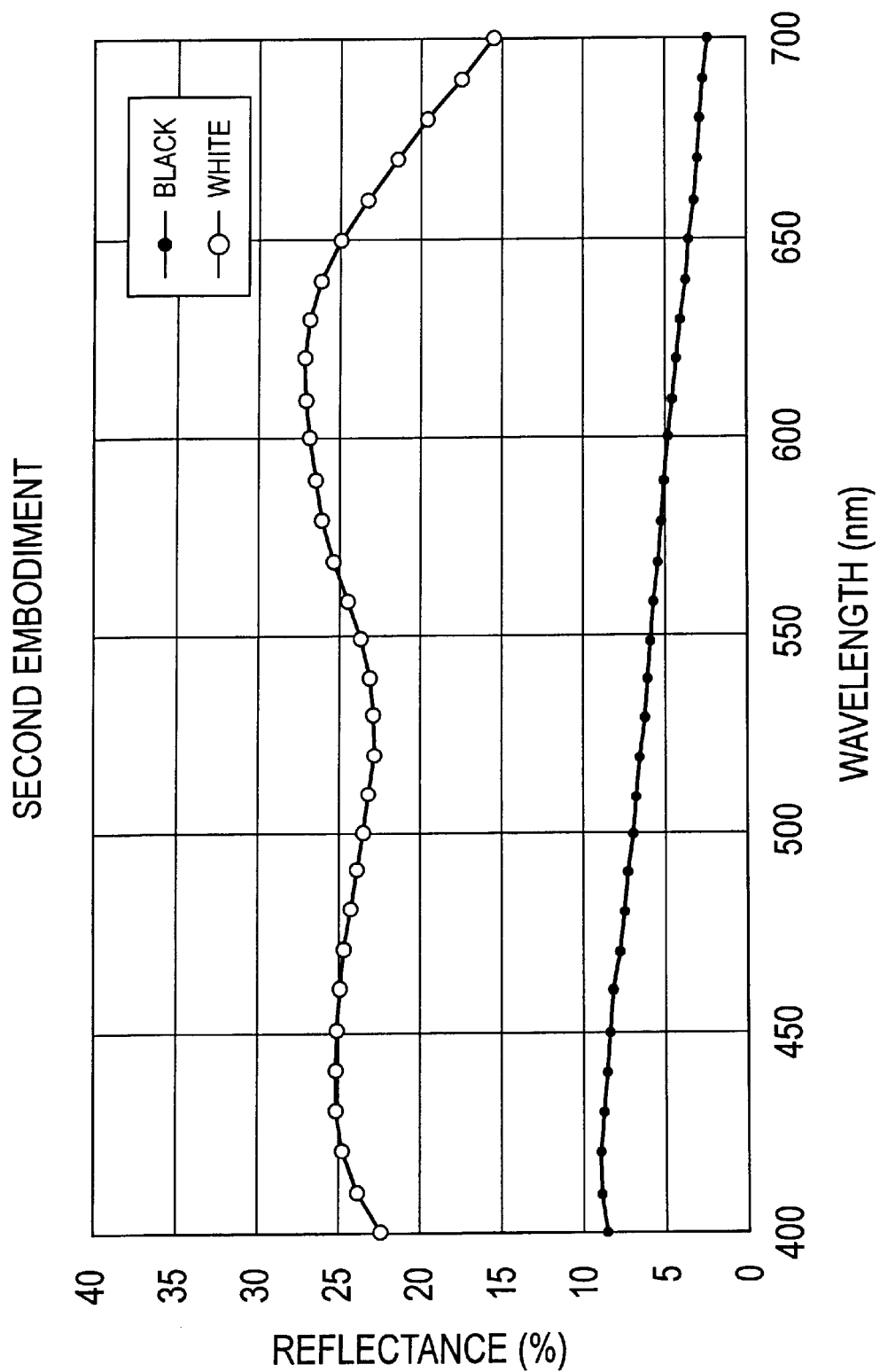
FIG. 18 shows a reflection spectra of the storage medium according to the second embodiment.

FIG. 18 shows an example of a reflection spectra of a storage medium of monochrome display according to the second embodiment. An integral reflectance at a white display was 37.0% for fine copy paper and 50.9% for newspaper, and a contrast ratio between black display and white display was 4.4, almost the same as that of newspaper.

Figure 19:
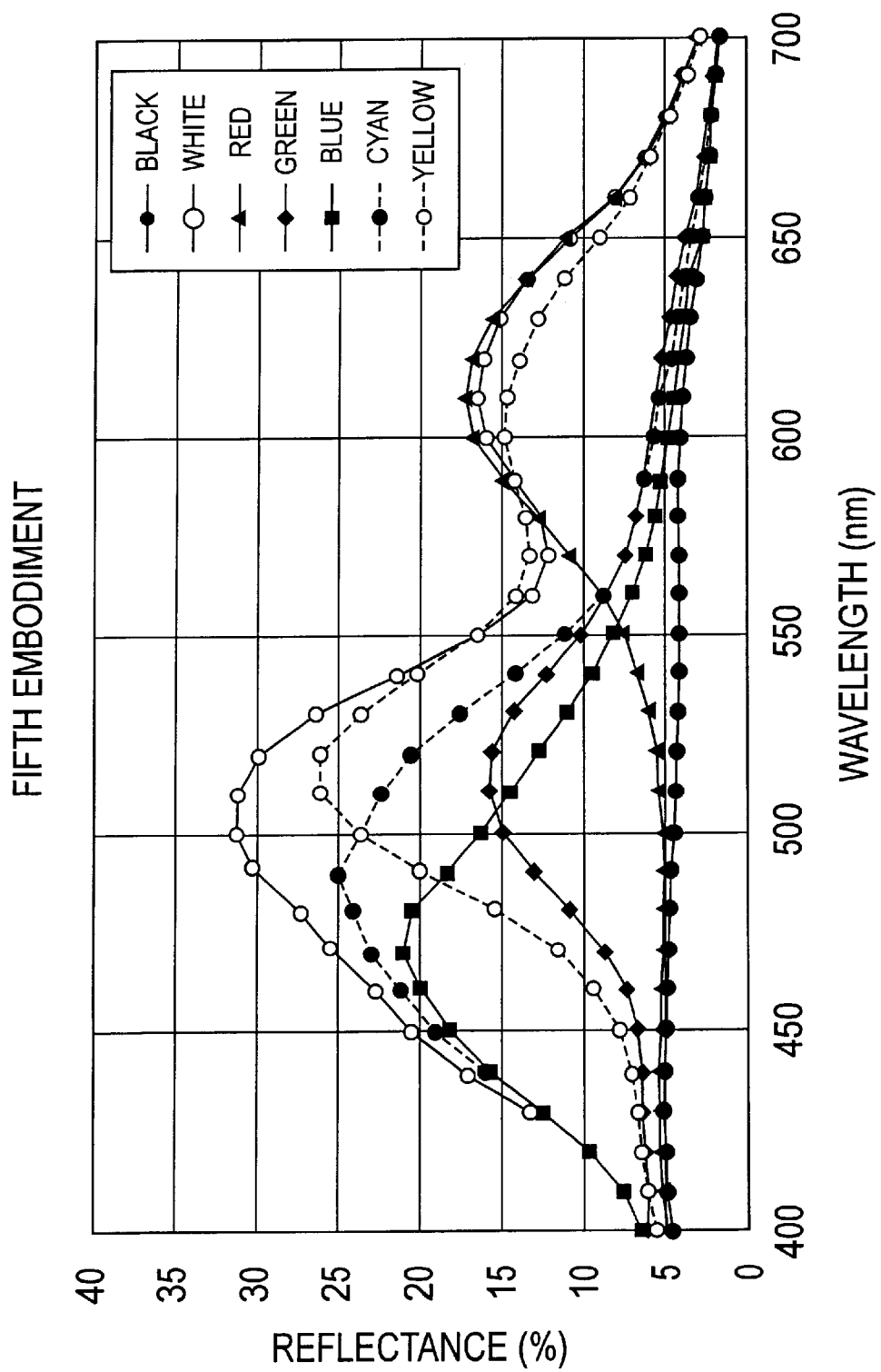
FIG. 19 shows a reflection spectra of the storage medium according to a fifth embodiment.

FIG. 19 shows an example of a reflection spectra of a storage medium of color display according to the fifth embodiment. An integral reflectance at a white display was 29.2% for fine copy paper and 40.3% for newspaper, and a contrast ratio between black display and white display was 4.9, almost the same as that of newspaper.

Figure 20:
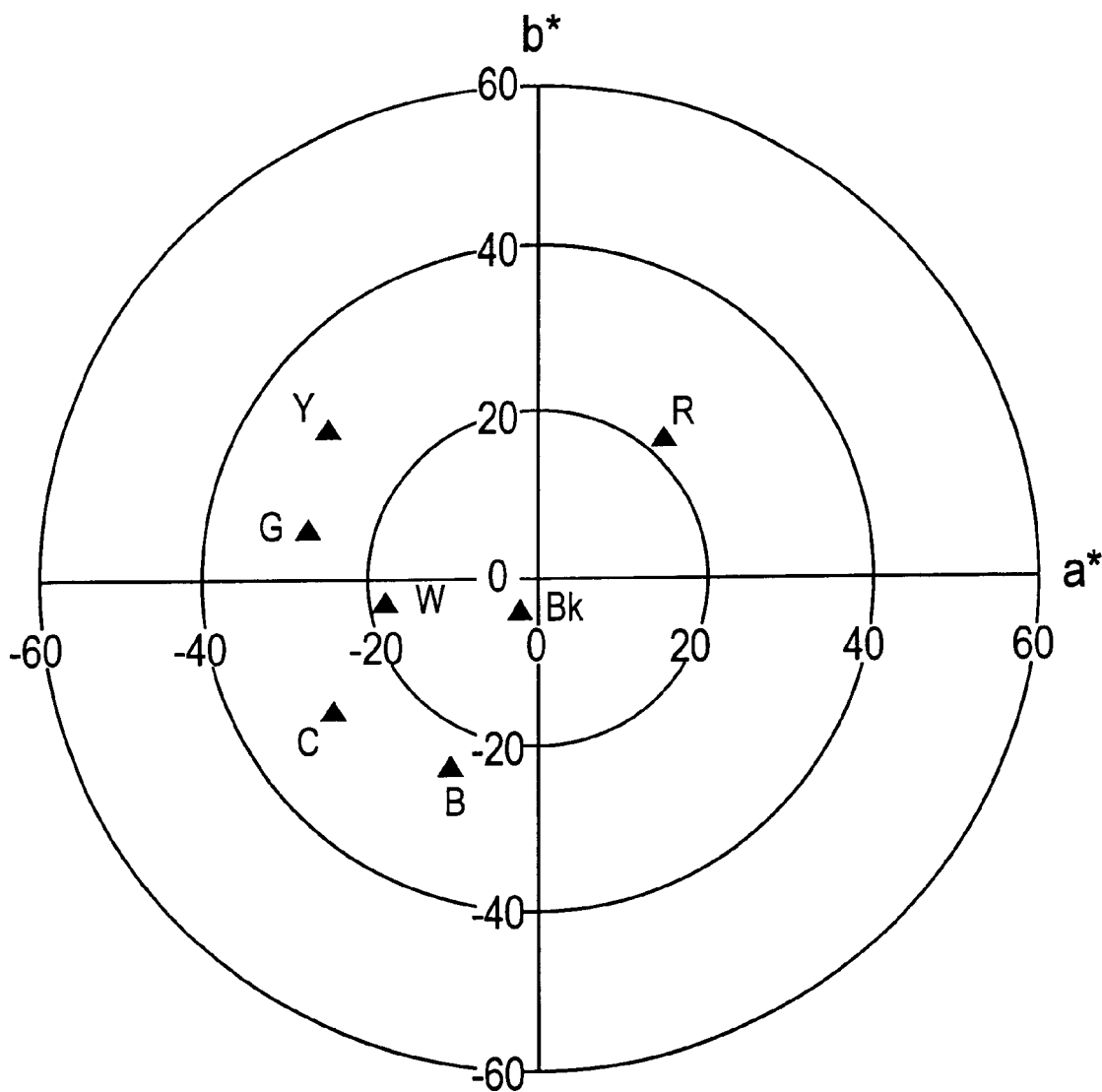
FIG. 20 shows the chromaticities of displayed colors of the storage medium according to a fifth embodiment.
Figure 21A:
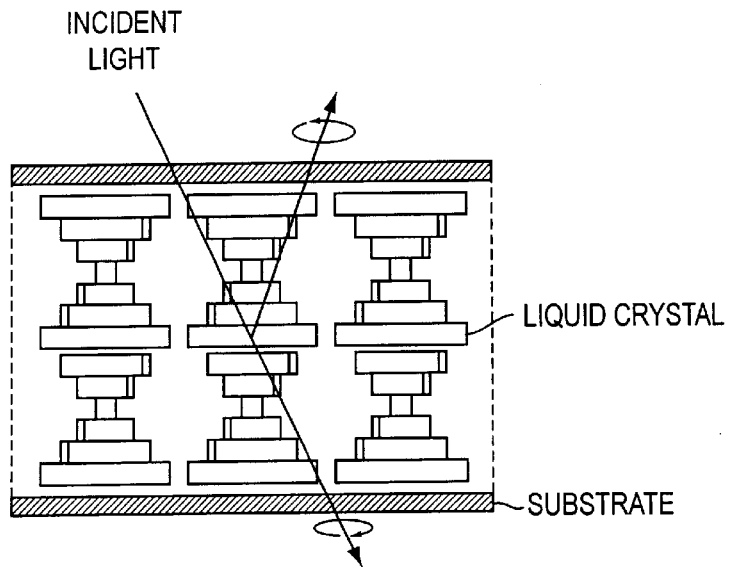
FIG. 21 shows the alignment change of cholesteric liquid crystals having positive dielectric anisotropy.
Figure 21B:
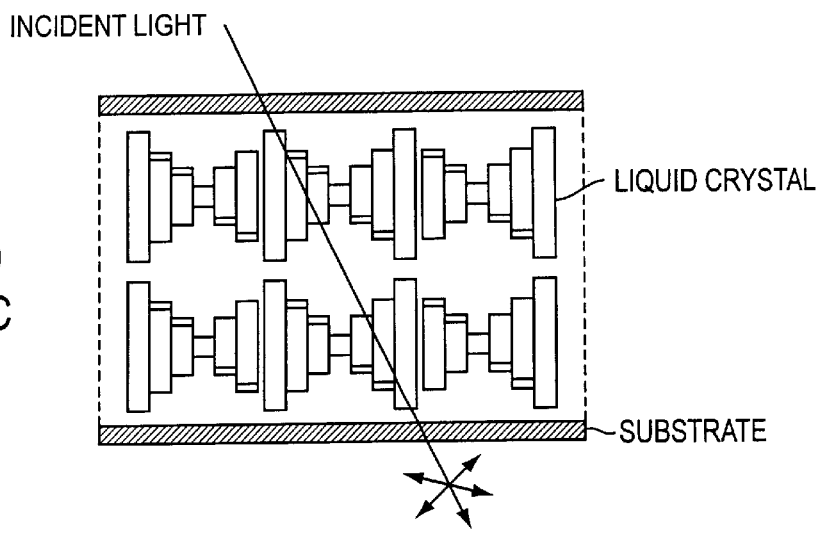
Figure 21C:
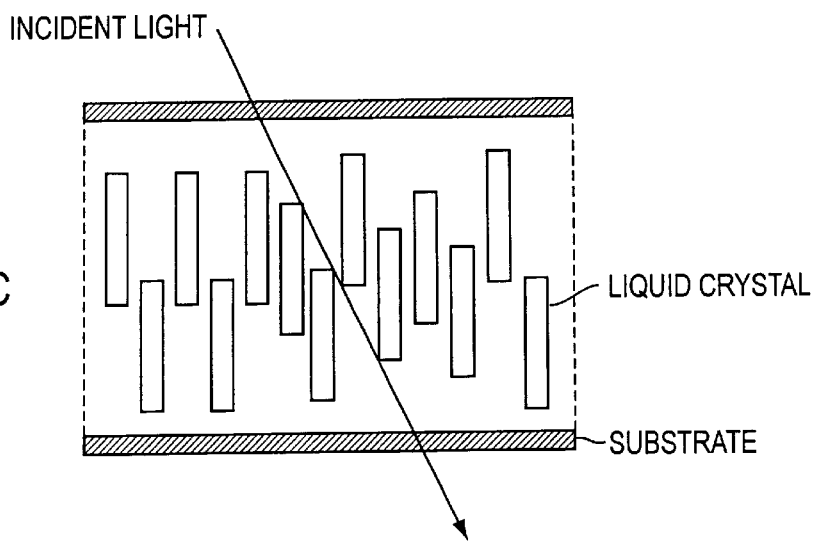

FIG. 20 shows an example of a*b* chromaticity coordinates system of a storage medium of color display according to the fifth embodiment. It is appreciated that, in a storage medium of color display according to the fifth embodiment, a total of seven colors—the five colors, blue, green, red, cyan, and yellow, in addition to the two achromatic colors—are displayed.

As described above, according to this invention, it is possible to provide a paper-like storage medium which has memory capability without power, provides a bright and high-contrast black-and-white reflective monochrome display or reflective full-color display, allows images to be written and updated quickly by external equipment, is structurally lightweight, thin, and flexible, and is inexpensive to manufacture. Therefore, repetitive use of the storage medium according to this invention will reduce paper consumption and contribute to conservation of energy and reduction of refuses.

Figure 22:
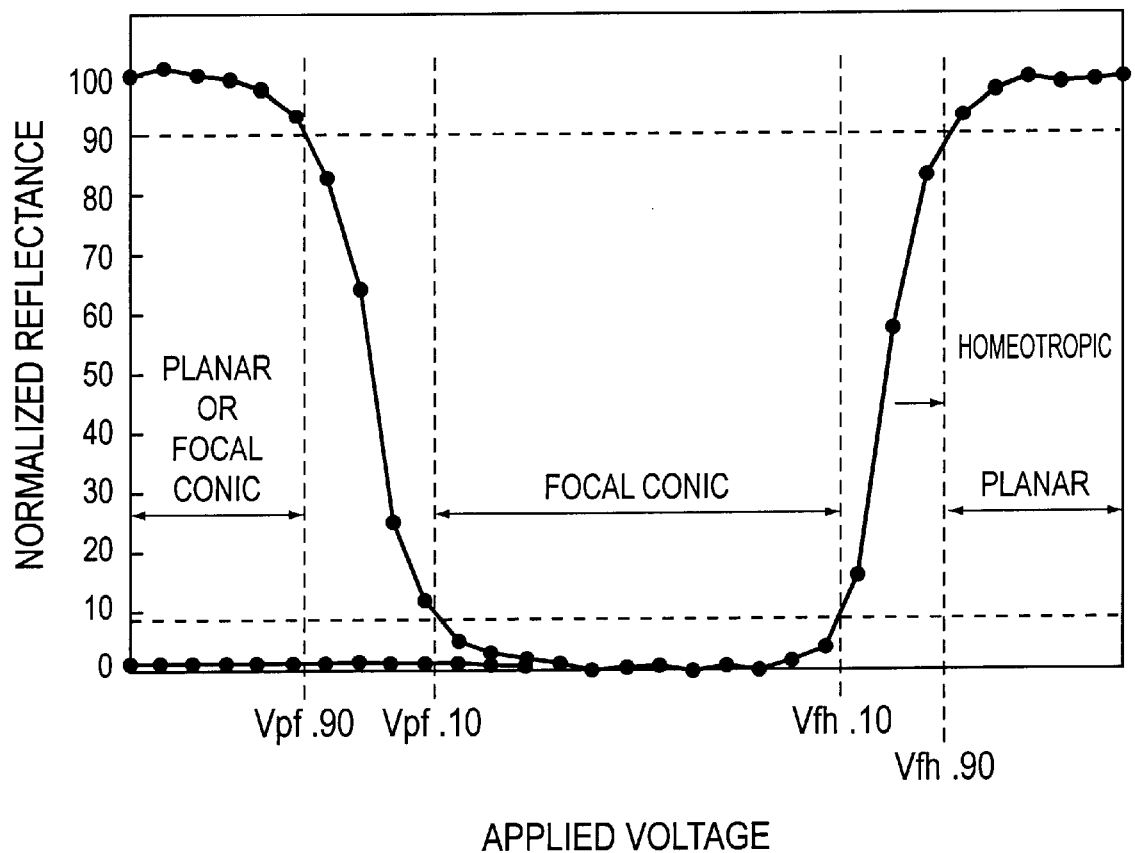
FIG. 22 shows an example of electro-optical response of cholesteric liquid crystals having positive dielectric anisotropy for a pulse signal.
Figure 23:
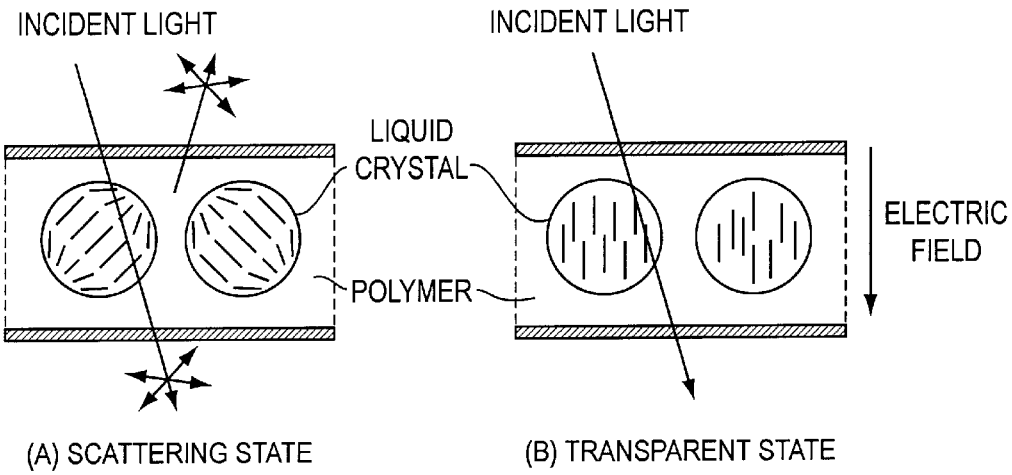
FIG. 23 shows the switching states of the first example of conventional display devices.
Figure 24:
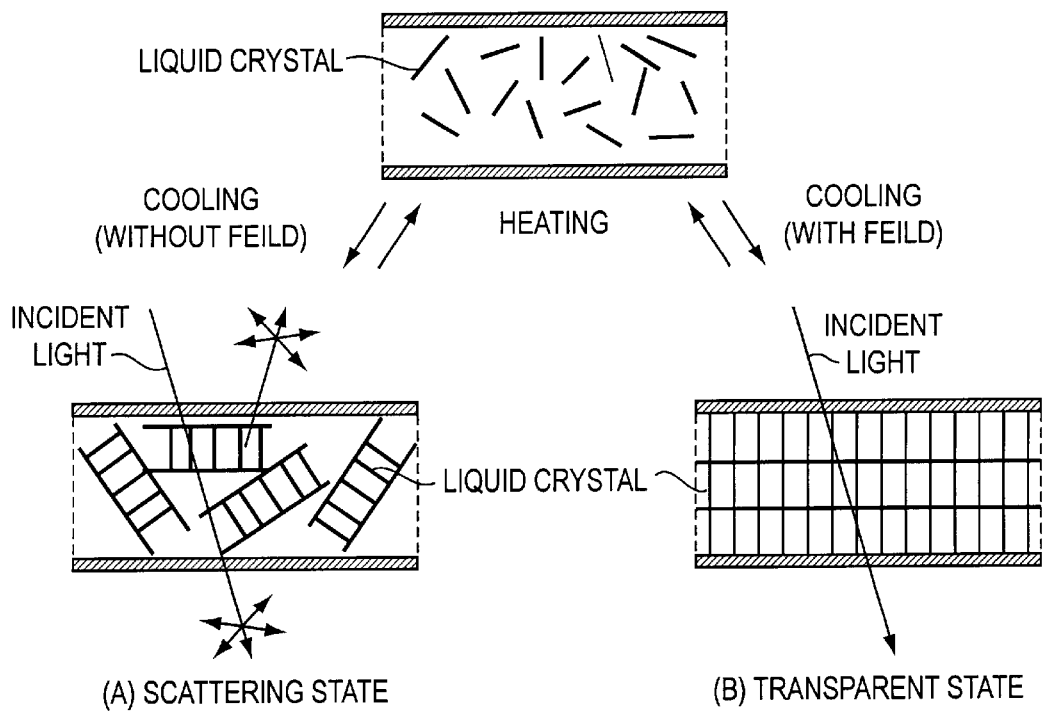
FIG. 24 shows the switching states of the second example of conventional display devices.
Figure 25:
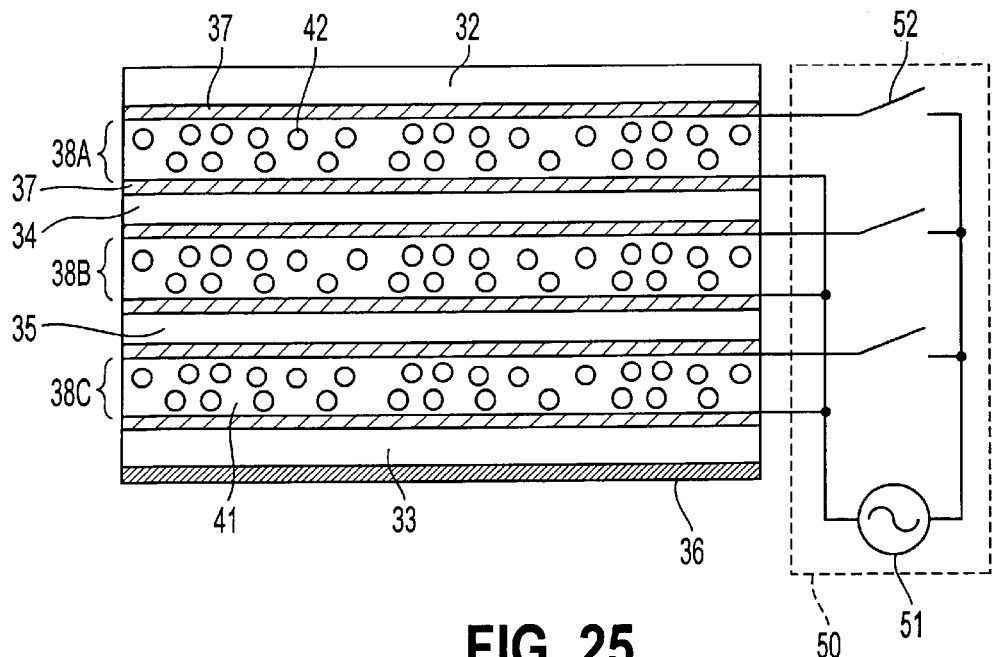
FIG. 25 shows the structure of the third example of conventional display devices.
Figure 26:
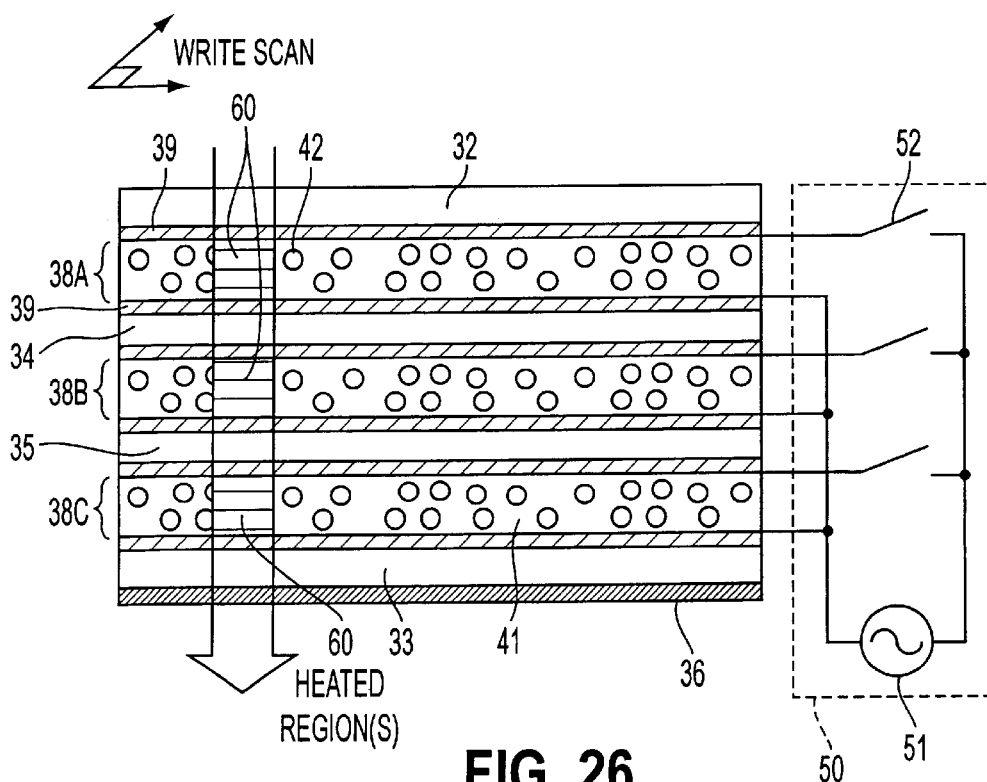
FIG. 26 shows the structure of the fourth example of conventional display devices.
Figures 27A, 27B:
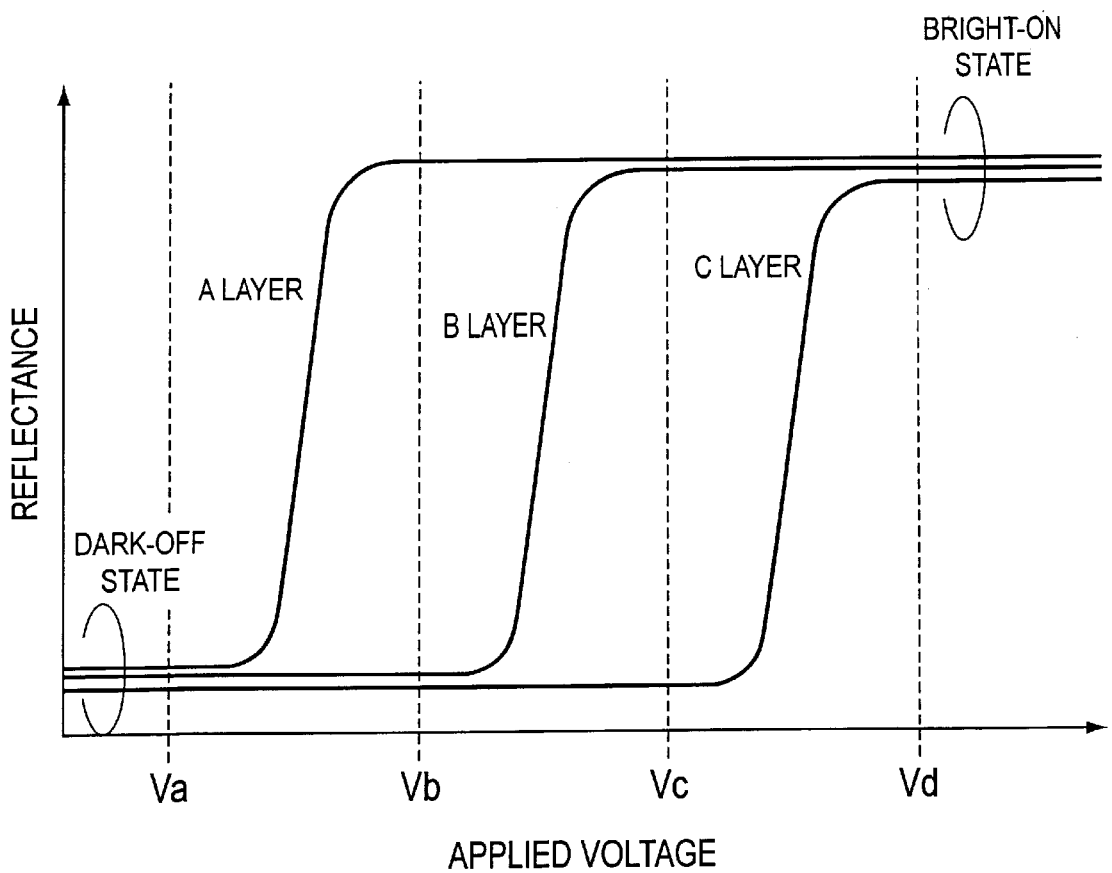
FIGS. 27(A)–27(B) show the electro-optical response and display states of the fifth example of conventional display devices.

While the above embodiments describe the display layers as comprised of cholesteric liquid crystals, other materials may be used which exhibit a "well-type" electro-optical response without departing from the spirit and scope of the present invention. Any type material, for example, that provides a "well-type" electro-optical response similar to that shown in FIG. 22, for example, without being limited to the specific data points shown in FIG. 22, may be used as part of the material making up the display layers.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. A storage medium for storing an image, comprising:
   a pair of substrates; and
   a plurality of display layers between the pair of substrates, the plurality of display layers being configured such that there are no electrodes between any two of the plurality of display layers, wherein each display layer comprises material that exhibits a well-type electro-optical response and each display layer has a texture change characteristic, and wherein the storage medium stores the image when a voltage is applied to the storage medium causing at least one of the plurality of display layers to change texture.

2. The storage medium according to claim 1, wherein each of the plurality of display layers have different texture change threshold voltages.

3. The storage medium according to claim 2, wherein each display layer reflects visible light of a particular color when a voltage, equal to or greater than the display layer's texture change threshold voltage, is applied to the display layer.

4. The storage medium according to claim 1, wherein the plurality of display layers comprise:
   a first display layer selectively reflecting colors having a peak wavelength in a range of approximately 400 to 500 nm;
   a second display layer selectively reflecting colors having a peak wavelength in a range of approximately 500 to 600 nm; and
   a third display layer selectively reflecting colors having a peak wavelength in a range of approximately 600 to 700 nm.

5. The storage medium according to claim 1, wherein the material for each of the plurality of display layers includes cholesteric liquid crystals.

6. The storage medium according to claim 5, wherein each of the plurality of display layers have a PNLC structure.

7. The storage medium according to claim 6, wherein the PNLC structure is formed by phase-separating a polymer and a cholesteric liquid crystal.

8. The storage medium according to claim 5, wherein each of the plurality of display layers have a PDLC structure.

9. The storage medium according to claim 8, wherein the PDLC structure is formed by phase-separating a polymer and a cholesteric liquid crystal.

10. The storage medium according to claim 1, wherein each of the plurality of display layers comprise two display layers which selectively reflect a mutually identical color and are opposite in a helical twisting direction to each other.

11. The storage medium according to claim 1, wherein the pair of substrates are flexible.

12. The storage medium according to claim 1, wherein the storage medium stores an image comprised of at least one of characters, graphics and data.

13. The storage medium according to claim 1, wherein a common electrode is provided in one substrate.

14. The storage medium according to claim 1, wherein neither one of the pair of substrates includes an electrode.

15. The storage medium according to claim 1, wherein each of the plurality of display layers reflects electromagnetic radiation when the texture of the display layer is changed to a reflecting texture.

16. The storage medium according to claim 1, wherein the substrates have large dielectric constants.

17. The storage medium according to claim 1, wherein the plurality of display layers are comprised of at least one of cholesterol derivatives doped with a chiral dopant, nematic liquid crystals doped with a chiral dopant, cholesterol derivative mixtures doped with a chiral dopant, and nematic liquid crystal mixtures doped with a chiral dopant.

18. The storage medium according to claim 17, wherein the cholesteric liquid crystals are doped with a plurality of chiral dopant which have differing twisting direction or exhibit reverse temperature dependence.

19. The storage medium according to claim 1, wherein the plurality of display layers comprise:
   a first display layer selectively reflecting blue light;
   a second display layer selectively reflecting green light; and
   a third display layer selectively reflecting red light.

20. The storage medium of claim 1, further comprising a light absorption layer, wherein light is transmitted through the plurality of display layers and is absorbed by the absorption layer.

21. A method of writing images to the storage medium of claim 1, comprising:
   applying a write signal over a normal operating range of the write signal to the plurality of display layers from an external image writing apparatus; and
   changing a texture of the plurality of display layers by controlling a select stage voltage of the write signal.

22. The method of claim 21, wherein the select stage voltage is greater than a refresh stage voltage of the write signal.

23. An apparatus in combination with the storage medium of claim 1, the apparatus comprising:
   at least one electrode in proximity to the storage medium; and
   a writing device, wherein the writing device applies a write signal over a normal operating range of the write signal to the plurality of display layers from outside the storage medium, the write signal having a select stage voltage that causes one or more of the display layers of the storage medium to change texture.

24. The apparatus of claim 23, wherein the select stage voltage is greater than a refresh stage voltage of the write signal.

25. The apparatus of claim 23, wherein the texture state is one of a planar texture and a focal conic texture.

26. The apparatus of claim 23, wherein the texture is one of a selective reflection texture and a transmission texture.

27. The apparatus of claim 23, wherein the writing device is one of a pen-type device, a line scan writing type device, a surface writing device.

28. The apparatus of claim 23, wherein the write signal causes the plurality of display layers to change to one of the following states:
   (1) each of the plurality of display layers have a planar texture;
   (2) each of the plurality of display layers have a focal conic texture;

(3) one of the plurality of display layers has a planar texture and the other of the plurality of display layers have a focal conic texture; and (4) two of the plurality of display layers have a planar texture and the other of the plurality of display layers have a focal conic texture.

29. The apparatus of claim 23, wherein the plurality of display layers comprise a first display layer having a high threshold voltage, a second display layer having a medium threshold voltage, and a third display layer having a low threshold voltage, and wherein the write signal causes the plurality of display layers to change to one of the following states:

(1) a state in which the first, second and third display layers each have a planar texture;

(2) a state in which the first, second and third display layers each have a focal conic texture;

(3) a state in which the first display layer has a planar texture and the second and third display layers have a focal conic texture;

(4) a state in which the second display layer has a planar texture and the first and third display layers have a focal conic texture;

(5) a state in which the third display layer has a planar texture and the first and second display layers have a focal conic texture;

(6) a state in which the first and second display layers have a planar texture and the third display layer has a focal conic texture; and (7) a state in which the second and third display layers have a planar texture and the first display layer has a focal conic texture.

30. The apparatus of claim 29, wherein the first display layer selectively reflects blue light, the second display layer selectively reflects green light, and the third display layer selectively reflects red light.

31. The storage medium according to claim 1, wherein the storage medium continues to store the stored image after the voltage applied to the storage medium is removed from the storage medium.

32. A storage medium comprising:

a first film;

a first color mixed solution that includes cholestic liquid crystals that exhibit a well-type electro-optical response and texture change characteristic disposed on the first film;

a second film disposed on the first film;

a second color mixed solution that includes cholestic liquid crystals that exhibit a well-type electro-optical response and texture change characteristic disposed on the second film;

a third film disposed on the second film;

a third color mixed solution that includes cholestic liquid crystals that exhibit a well-type electro-optical response and texture change characteristic disposed on the third film; and a fourth film disposed on the third film.

33. A storage medium for storing an image, comprising;

a pair of substrates;

a plurality of layers between the pair of substrates, each of the plurality of layers comprising a cholesteric liquid crystal that exhibits a well-type electro-optical response and texture change characteristic, wherein each one of the plurality of layers changes texture when a predetermined voltage is applied from outside the storage medium.

34. The storage medium of claim 33, wherein each of the plurality of layers selectively reflect a different color of visible light.

35. The storage medium of claim 33, wherein each one of the plurality of layers have a different texture change threshold voltage from other layers of the plurality of layers.

* * * * *